(12) United States Patent  (10) Patent No.: US 8,316,015 B2
Svendsen et al.  (45) Date of Patent: *Nov. 20, 2012

(54) TUNERSPHERE

(75) Inventors: Hugh Svendsen, Chapel Hill, NC (US); Scott Curtis, Durham, NC (US)

(73) Assignee: Lemi Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,688

(22) Filed: Sep. 9, 2011

(65) Prior Publication Data

US 2012/0072418 A1 Mar. 22, 2012

Related U.S. Application Data

(63) Continuation-in-part of application No. 12/192,682, filed on Aug. 15, 2008, now Pat. No. 8,117,193, which is a continuation-in-part of application No. 11/963,050, filed on Dec. 21, 2007, now Pat. No. 8,060,525.

(51) Int. Cl.
G06F 17/30 (2006.01)
(52) U.S. Cl. .......................... 707/722; 707/913; 707/919
(58) Field of Classification Search .................. 707/722, 707/913, 919
See application file for complete search history.

(56) References Cited

U.S. PATENT DOCUMENTS

| | | |
|---|---|---|
| 3,291,919 A | 12/1966 | Robitaille |
| 4,682,370 A | 7/1987 | Matthews |
| 4,720,873 A | 1/1988 | Goodman et al. |
| 4,788,675 A | 11/1988 | Jones et al. |
| 4,920,432 A | 4/1990 | Eggers et al. |
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |

(Continued)

FOREIGN PATENT DOCUMENTS

EP  0672991 B1  5/1998

(Continued)

OTHER PUBLICATIONS

"Tag cloud in standalone player—Feedback and Ideas—Last.fm," at <http://www.last.fm/forum/217171/_/333289>, posting dated Oct. 4, 2007,copyright 2002-2007, Last.fm Ltd., printed Oct. 17, 2007, 2 pages.

(Continued)

*Primary Examiner* — Cheryl Lewis
(74) *Attorney, Agent, or Firm* — Withrow & Terranova, PLLC

(57) ABSTRACT

Systems and methods for providing representative information for a geographic area of interest are disclosed. In one embodiment, a media service tracks media interaction histories (e.g., play histories) for a number of users registered with the media service, where each media interaction history identifies media items interacted with by the corresponding user as well as the locations at which at least a subset of the media items were interacted with by the corresponding user. The media service receives a request from a requesting user for representative information for a geographic area of interest. In response to receiving the request, the media service determines representative information for the geographic area of interest based on at least a subset of the media interaction histories of the users and effects presentation of the representative information to the requesting user.

30 Claims, 17 Drawing Sheets

U.S. PATENT DOCUMENTS

| | | | |
|---|---|---|---|
| 5,305,438 A | 4/1994 | MacKay et al. |
| 5,351,276 A | 9/1994 | Doll, Jr. et al. |
| 5,396,417 A | 3/1995 | Burks et al. |
| 5,414,455 A | 5/1995 | Hooper et al. |
| 5,442,701 A | 8/1995 | Guillou et al. |
| 5,455,570 A | 10/1995 | Cook et al. |
| 5,526,284 A | 6/1996 | Mankovitz |
| 5,539,635 A | 7/1996 | Larson, Jr. |
| 5,557,541 A | 9/1996 | Schulhof et al. |
| 5,572,442 A | 11/1996 | Schulhof et al. |
| 5,592,511 A | 1/1997 | Schoen et al. |
| 5,617,565 A | 4/1997 | Augenbraun et al. |
| 5,629,867 A | 5/1997 | Goldman |
| 5,706,427 A | 1/1998 | Tabuki |
| 5,721,827 A | 2/1998 | Logan et al. |
| 5,732,216 A | 3/1998 | Logan et al. |
| 5,734,893 A | 3/1998 | Li et al. |
| 5,758,257 A | 5/1998 | Herz et al. |
| 5,790,935 A | 8/1998 | Payton |
| 5,809,246 A | 9/1998 | Goldman |
| 5,815,662 A | 9/1998 | Ong |
| 5,818,510 A | 10/1998 | Cobbley et al. |
| 5,819,160 A | 10/1998 | Foladare et al. |
| 5,819,273 A | 10/1998 | Vora et al. |
| 5,852,610 A | 12/1998 | Olaniyan |
| 5,855,015 A | 12/1998 | Shoham |
| 5,857,149 A | 1/1999 | Suzuki |
| 5,864,682 A | 1/1999 | Porter et al. |
| 5,907,831 A | 5/1999 | Lotvin et al. |
| 5,920,856 A | 7/1999 | Syeda-Mahmood |
| 5,926,624 A | 7/1999 | Katz et al. |
| 5,943,422 A | 8/1999 | Van Wie et al. |
| 5,949,492 A | 9/1999 | Mankovitz |
| 5,953,005 A | 9/1999 | Liu |
| 5,956,716 A | 9/1999 | Kenner et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 6,006,225 A | 12/1999 | Bowman et al. |
| 6,009,422 A | 12/1999 | Ciccarelli |
| 6,014,569 A | 1/2000 | Bottum |
| 6,018,768 A | 1/2000 | Ullman et al. |
| 6,029,165 A | 2/2000 | Gable |
| 6,038,591 A | 3/2000 | Wolfe et al. |
| 6,060,997 A | 5/2000 | Taubenheim et al. |
| 6,067,562 A | 5/2000 | Goldman |
| 6,081,780 A | 6/2000 | Lumelsky |
| 6,081,830 A | 6/2000 | Schindler |
| 6,088,455 A | 7/2000 | Logan et al. |
| 6,088,722 A | 7/2000 | Herz et al. |
| 6,093,880 A | 7/2000 | Arnalds |
| 6,108,686 A | 8/2000 | Williams, Jr. |
| 6,122,757 A | 9/2000 | Kelley |
| 6,125,387 A | 9/2000 | Simonoff et al. |
| 6,128,663 A | 10/2000 | Thomas |
| 6,144,375 A | 11/2000 | Jain et al. |
| 6,161,142 A | 12/2000 | Wolfe et al. |
| 6,167,393 A | 12/2000 | Davis, III et al. |
| 6,169,573 B1 | 1/2001 | Sampath-Kumar et al. |
| 6,182,128 B1 | 1/2001 | Kelkar et al. |
| 6,199,076 B1 | 3/2001 | Logan et al. |
| 6,223,210 B1 | 4/2001 | Hickey |
| 6,226,672 B1 | 5/2001 | DeMartin et al. |
| 6,229,621 B1 | 5/2001 | Kulakowski et al. |
| 6,233,682 B1 | 5/2001 | Fritsch |
| 6,246,672 B1 | 6/2001 | Lumelsky |
| 6,248,946 B1 | 6/2001 | Dwek |
| 6,253,069 B1 | 6/2001 | Mankovitz |
| 6,263,507 B1 | 7/2001 | Ahmad et al. |
| 6,289,165 B1 | 9/2001 | Abecassis |
| 6,292,786 B1 | 9/2001 | Deaton et al. |
| 6,295,555 B1 | 9/2001 | Goldman |
| 6,311,194 B1 | 10/2001 | Sheth et al. |
| 6,314,094 B1 | 11/2001 | Boys |
| 6,317,784 B1 | 11/2001 | Mackintosh et al. |
| 6,334,127 B1 | 12/2001 | Bieganski et al. |
| 6,335,927 B1 | 1/2002 | Elliott et al. |
| 6,338,044 B1 | 1/2002 | Cook et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,329 B1 | 2/2002 | Mackintosh et al. |
| 6,349,339 B1 | 2/2002 | Williams |
| 6,351,733 B1 | 2/2002 | Saunders et al. |
| 6,377,782 B1 | 4/2002 | Bishop et al. |
| 6,385,596 B1 | 5/2002 | Wiser et al. |
| 6,389,467 B1 | 5/2002 | Eyal |
| 6,411,992 B1 | 6/2002 | Srinivasan et al. |
| 6,415,282 B1 | 7/2002 | Mukherjea et al. |
| 6,438,579 B1 | 8/2002 | Hosken |
| 6,473,792 B1 | 10/2002 | Yavitz et al. |
| 6,477,707 B1 | 11/2002 | King et al. |
| 6,484,199 B2 | 11/2002 | Eyal |
| 6,487,390 B1 | 11/2002 | Virine et al. |
| 6,496,802 B1 | 12/2002 | van Zoest et al. |
| 6,502,194 B1 | 12/2002 | Berman et al. |
| 6,505,123 B1 | 1/2003 | Root et al. |
| 6,519,648 B1 | 2/2003 | Eyal |
| 6,546,555 B1 | 4/2003 | Hjelsvold et al. |
| 6,560,651 B2 | 5/2003 | Katz et al. |
| 6,581,103 B1 | 6/2003 | Dengler |
| 6,587,127 B1 | 7/2003 | Leeke et al. |
| 6,600,898 B1 | 7/2003 | De Bonet et al. |
| 6,609,096 B1 | 8/2003 | De Bonet et al. |
| 6,615,039 B1 | 9/2003 | Eldering |
| 6,628,928 B1 | 9/2003 | Crosby et al. |
| 6,662,231 B1 | 12/2003 | Drosset et al. |
| 6,670,537 B2 | 12/2003 | Hughes et al. |
| 6,684,249 B1 | 1/2004 | Frerichs et al. |
| 6,697,824 B1 | 2/2004 | Bowman-Amuah |
| 6,701,355 B1 | 3/2004 | Brandt et al. |
| 6,711,622 B1 | 3/2004 | Fuller et al. |
| 6,721,741 B1 | 4/2004 | Eyal et al. |
| 6,725,275 B2 | 4/2004 | Eyal |
| 6,735,628 B2 | 5/2004 | Eyal |
| 6,741,869 B1 | 5/2004 | Lehr |
| 6,748,237 B1 | 6/2004 | Bates et al. |
| 6,772,127 B2 | 8/2004 | Saunders et al. |
| 6,792,470 B2 | 9/2004 | Hakenberg et al. |
| 6,793,142 B2 | 9/2004 | Yap |
| 6,823,225 B1 | 11/2004 | Sass |
| 6,879,963 B1 | 4/2005 | Rosenberg |
| 6,882,641 B1 | 4/2005 | Gallick et al. |
| 6,925,489 B1 | 8/2005 | Curtin |
| 6,976,228 B2 | 12/2005 | Bernhardson |
| 6,981,040 B1 | 12/2005 | Konig et al. |
| 6,985,694 B1 | 1/2006 | De Bonet et al. |
| 6,999,783 B2 | 2/2006 | Toyryla et al. |
| 7,010,263 B1 | 3/2006 | Patsiokas |
| 7,010,537 B2 | 3/2006 | Eyal et al. |
| 7,010,613 B2 | 3/2006 | Connor |
| 7,028,082 B1 | 4/2006 | Rosenberg et al. |
| 7,031,931 B1 | 4/2006 | Meyers |
| 7,035,871 B2 | 4/2006 | Hunt et al. |
| 7,058,694 B1 | 6/2006 | De Bonet et al. |
| 7,061,482 B2 | 6/2006 | Ferris |
| 7,072,309 B2 | 7/2006 | Xie et al. |
| 7,079,807 B1 | 7/2006 | Daum et al. |
| 7,102,067 B2 | 9/2006 | Gang et al. |
| 7,120,619 B2 | 10/2006 | Drucker et al. |
| 7,130,608 B2 | 10/2006 | Hollström et al. |
| 7,133,924 B1 | 11/2006 | Rosenberg et al. |
| 7,139,770 B2 | 11/2006 | Nakase et al. |
| 7,149,961 B2 | 12/2006 | Harville et al. |
| 7,149,983 B1 | 12/2006 | Robertson et al. |
| 7,171,491 B1 | 1/2007 | O'Toole et al. |
| 7,203,838 B1 | 4/2007 | Glazer et al. |
| 7,206,838 B2 | 4/2007 | Boyd et al. |
| 7,227,071 B2 | 6/2007 | Tagawa et al. |
| 7,245,925 B2 | 7/2007 | Zellner |
| 7,277,955 B2 | 10/2007 | Elliott |
| 7,343,141 B2 | 3/2008 | Ellis et al. |
| 7,468,934 B1 | 12/2008 | Janik |
| 7,469,283 B2 | 12/2008 | Eyal et al. |
| 7,523,156 B2 | 4/2009 | Giacalone, Jr. |

| | | |
|---|---|---|
| 7,577,665 B2 | 8/2009 | Ramer et al. |
| 7,594,246 B1 | 9/2009 | Billmaier et al. |
| 7,680,699 B2 | 3/2010 | Porter et al. |
| 7,680,959 B2 | 3/2010 | Svendsen |
| 7,711,838 B1 | 5/2010 | Boulter et al. |
| 7,765,192 B2 | 7/2010 | Svendsen |
| 7,783,722 B1 | 8/2010 | Rosenberg et al. |
| 7,797,272 B2 | 9/2010 | Picker et al. |
| 7,797,321 B2 | 9/2010 | Martin et al. |
| 7,827,110 B1 | 11/2010 | Wieder |
| 7,827,236 B2 | 11/2010 | Ferris |
| 7,840,691 B1 | 11/2010 | De Bonet et al. |
| 7,853,622 B1 | 12/2010 | Baluja et al. |
| 7,856,485 B2 | 12/2010 | Prager et al. |
| 7,870,088 B1 | 1/2011 | Chen et al. |
| 7,886,072 B2 | 2/2011 | Wormington et al. |
| 7,904,505 B2 | 3/2011 | Rakers et al. |
| 7,917,645 B2 | 3/2011 | Ikezoye et al. |
| 7,917,932 B2 | 3/2011 | Krikorian |
| 7,926,085 B2 | 4/2011 | Del Beccaro et al. |
| 8,045,952 B2 | 10/2011 | Qureshey et al. |
| 8,050,652 B2 | 11/2011 | Qureshey et al. |
| 8,060,525 B2 * | 11/2011 | Svendsen et al. ............ 707/769 |
| 8,112,720 B2 | 2/2012 | Curtis |
| 8,117,193 B2 * | 2/2012 | Svendsen et al. ............ 707/722 |
| 2001/0025259 A1 | 9/2001 | Rouchon |
| 2001/0051852 A1 | 12/2001 | Sundaravel et al. |
| 2002/0002039 A1 | 1/2002 | Qureshey et al. |
| 2002/0010759 A1 | 1/2002 | Hitson et al. |
| 2002/0023084 A1 | 2/2002 | Eyal et al. |
| 2002/0023270 A1 | 2/2002 | Thomas et al. |
| 2002/0035616 A1 | 3/2002 | Diamond et al. |
| 2002/0053078 A1 | 5/2002 | Holtz et al. |
| 2002/0072326 A1 | 6/2002 | Qureshey et al. |
| 2002/0116082 A1 | 8/2002 | Gudorf |
| 2002/0116476 A1 | 8/2002 | Eyal et al. |
| 2002/0161858 A1 | 10/2002 | Goldman |
| 2002/0165912 A1 | 11/2002 | Wenocur et al. |
| 2002/0183059 A1 | 12/2002 | Noreen et al. |
| 2002/0199001 A1 | 12/2002 | Wenocur et al. |
| 2003/0001907 A1 | 1/2003 | Bergsten et al. |
| 2003/0018799 A1 | 1/2003 | Eyal |
| 2003/0033420 A1 | 2/2003 | Eyal et al. |
| 2003/0041110 A1 | 2/2003 | Wenocur et al. |
| 2003/0088479 A1 | 5/2003 | Wooten et al. |
| 2003/0103644 A1 | 6/2003 | Klayh |
| 2003/0137531 A1 | 7/2003 | Katinsky et al. |
| 2004/0006634 A1 | 1/2004 | Ferris |
| 2004/0019497 A1 | 1/2004 | Volk et al. |
| 2004/0073919 A1 | 4/2004 | Gutta et al. |
| 2004/0186733 A1 | 9/2004 | Loomis et al. |
| 2004/0199494 A1 | 10/2004 | Bhatt |
| 2004/0255340 A1 | 12/2004 | Logan |
| 2005/0021470 A1 | 1/2005 | Martin et al. |
| 2005/0044561 A1 | 2/2005 | McDonald |
| 2005/0060666 A1 | 3/2005 | Hoshino et al. |
| 2005/0198233 A1 | 9/2005 | Manchester et al. |
| 2005/0256866 A1 | 11/2005 | Lu et al. |
| 2005/0278380 A1 | 12/2005 | Ferris |
| 2006/0026147 A1 | 2/2006 | Cone et al. |
| 2006/0072724 A1 | 4/2006 | Cohen et al. |
| 2006/0085349 A1 | 4/2006 | Hug |
| 2006/0101003 A1 | 5/2006 | Carson et al. |
| 2006/0143236 A1 | 6/2006 | Wu |
| 2006/0171395 A1 | 8/2006 | Deshpande |
| 2006/0195442 A1 | 8/2006 | Cone et al. |
| 2006/0288074 A1 | 12/2006 | Rosenberg |
| 2007/0033292 A1 | 2/2007 | Sull et al. |
| 2007/0043766 A1 | 2/2007 | Nicholas et al. |
| 2007/0061301 A1 | 3/2007 | Ramer et al. |
| 2007/0074617 A1 | 4/2007 | Vergo |
| 2007/0078660 A1 | 4/2007 | Ferris |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0156647 A1 | 7/2007 | Shen et al. |
| 2007/0156897 A1 | 7/2007 | Lim |
| 2007/0169148 A1 | 7/2007 | Oddo et al. |
| 2007/0174147 A1 | 7/2007 | Klein, Jr. |
| 2007/0180063 A1 | 8/2007 | Qureshey et al. |
| 2007/0182532 A1 | 8/2007 | Lengning et al. |
| 2007/0233743 A1 | 10/2007 | Rosenberg |
| 2007/0250571 A1 | 10/2007 | Griffin |
| 2007/0265979 A1 | 11/2007 | Hangartner |
| 2007/0266031 A1 | 11/2007 | Adams et al. |
| 2007/0282949 A1 | 12/2007 | Fischer et al. |
| 2007/0283268 A1 | 12/2007 | Berger et al. |
| 2007/0286169 A1 | 12/2007 | Roman |
| 2008/0016205 A1 | 1/2008 | Svendsen |
| 2008/0031433 A1 | 2/2008 | Sapp et al. |
| 2008/0052371 A1 | 2/2008 | Partovi et al. |
| 2008/0052380 A1 | 2/2008 | Morita et al. |
| 2008/0085769 A1 | 4/2008 | Lutnick et al. |
| 2008/0091771 A1 | 4/2008 | Allen et al. |
| 2008/0162435 A1 | 7/2008 | Dooms et al. |
| 2008/0208820 A1 | 8/2008 | Usey et al. |
| 2008/0209013 A1 | 8/2008 | Weel |
| 2008/0243733 A1 | 10/2008 | Black |
| 2008/0249870 A1 | 10/2008 | Angell et al. |
| 2008/0250312 A1 | 10/2008 | Curtis |
| 2008/0261516 A1 | 10/2008 | Robinson |
| 2008/0313308 A1 | 12/2008 | Bodin et al. |
| 2009/0013347 A1 | 1/2009 | Ahanger et al. |
| 2009/0049390 A1 | 2/2009 | Nason et al. |
| 2009/0055376 A1 | 2/2009 | Slaney et al. |
| 2009/0061763 A1 | 3/2009 | Dillon et al. |
| 2009/0063414 A1 | 3/2009 | White et al. |
| 2009/0063645 A1 | 3/2009 | Casey et al. |
| 2009/0063971 A1 | 3/2009 | White et al. |
| 2009/0064029 A1 | 3/2009 | Corkran et al. |
| 2009/0070267 A9 | 3/2009 | Hangartner |
| 2009/0077041 A1 | 3/2009 | Eyal et al. |
| 2009/0077220 A1 | 3/2009 | Svendsen et al. |
| 2009/0093300 A1 | 4/2009 | Lutnick et al. |
| 2009/0164429 A1 | 6/2009 | Svendsen et al. |
| 2009/0164448 A1 | 6/2009 | Curtis |
| 2009/0164516 A1 | 6/2009 | Svendsen et al. |
| 2009/0198666 A1 | 8/2009 | Winston et al. |
| 2009/0222520 A1 | 9/2009 | Sloo et al. |
| 2010/0017455 A1 | 1/2010 | Svendsen et al. |
| 2010/0185732 A1 | 7/2010 | Hyman |
| 2010/0199295 A1 | 8/2010 | Katpelly et al. |
| 2010/0228740 A1 | 9/2010 | Cannistraro et al. |
| 2010/0280835 A1 | 11/2010 | Issa et al. |
| 2010/0324704 A1 | 12/2010 | Murphy et al. |
| 2010/0325123 A1 | 12/2010 | Morrison et al. |
| 2011/0016483 A1 | 1/2011 | Opdycke |
| 2011/0034121 A1 | 2/2011 | Ng et al. |
| 2012/0042094 A1 | 2/2012 | Qureshey et al. |
| 2012/0042337 A1 | 2/2012 | De Bonet et al. |
| 2012/0054233 A1 | 3/2012 | Svendsen et al. |
| 2012/0066038 A1 | 3/2012 | Issa et al. |
| 2012/0072846 A1 | 3/2012 | Curtis |

FOREIGN PATENT DOCUMENTS

| | | |
|---|---|---|
| EP | 0952732 A2 | 10/1999 |
| EP | 00/04730 A1 | 1/2000 |
| EP | 0984584 A1 | 3/2000 |
| GB | 2306869 A | 5/1997 |
| GB | 2397205 A | 7/2004 |
| WO | 97/266601 A2 | 7/1997 |
| WO | 2006/079973 A1 | 8/2006 |
| WO | 2007/041369 A2 | 4/2007 |
| WO | 2007/041370 A2 | 4/2007 |

OTHER PUBLICATIONS

"TalkStremtve.com—A Dynamic Direcory of Steaming Radio," at <http://www.talkstreamlive.com/aboutus.aspx>, from the Internet Archive, dated Aug. 1, 2008, copyright 2006-2008, 3 pages.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University, Delft, The Netherlands, 2003, 23 pages.

Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 15-20, 2005, San Jose, California, Proceedings published Mar. 8, 2005, found at <http://citeseerx.ist.psu.edu/viewdoc/download?doi=10.1.1.108.3459&rep=rep1&type=pdf>, 10 pages.

"Welcome to Internet Talk Radio from Talkzone.corn," at <http://www.talkzone.com/> from the Internet Archive, dated Jul. 19, 2008, copyright 2007-2008, Syndication Networks Corp., 2 pages.

"What is BlogTalkRadio," at <http://www.blogtalkradio.com/whatis.aspx> from the Internet Archive, dated Feb. 28, 2009, copyright 2009, appears that it may have existed in 2008, BlogTalkRadio.com, 2 pages.

"YouTube—Broadcast Yourself.," at <http://www.youtube.com/>, copyright 2007, YouTube, LLC, printed Oct. 26, 2007, 2 pages.

"About Intermind's Channel Communications Patents," downloaded from <http://www.intermind.com/materials/patent_desc.html> on Feb. 27, 1998, 5 pages.

"About.com; http://quintura.com/," at <http://websearch.about.com/gi/dynamic/offisite.htm?zi=1/XJ&sdn=web...f=10&su=p284.8.150.ip_&tt=13&bt=0&bts=0&zy=http%3A//quintura.com/>, copyright 2007, Quintura Inc., printed Oct. 17, 2007, 2 pages.

Abstract, Elliott, G.T. and Tomlinson, B., "Personal Soundtrack: context-aware playlists that adapt to user pace," Conference on Human Factors in Computing Systems 2006 (CHI '06), Apr. 22-27, 2006, Montreal, Quebec, Canada, pp. 736-741, ACM Press, New York, NY, found at http://portalacm.org/citation.cfm?id=1125451.1125599>, ACM Portal, printed Oct. 2, 2007, 3 pages.

Abstract, Reddy, S. and Masora, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

Aguilera, M.K. and Strom, R.E., "Efficient Atomic Broadcast Using Deterministic Merge," Proceedings of ACM Symposium on Principles of Distributed Computing (PODC), Jul. 16-19, 2000, copyright 2000, ACM, New York, New York, 10 pages.

"anthony.liekens.net >> Music >> Cloud," at <http://anthony.liekens.net/index.php/Music/Cloud>, page last modified on Apr. 12, 2007, copyright 2000-2006, Anthony Liekens, printed Oct. 17, 2007, 4 pages.

"AOL Music Now," at <http://web.archive.org/web/20060508184531/aol.musicnow.com/az/home.jhtml?_requesti...>, copyright 2006, AOL Music Now L.L.C, printed Nov. 16, 2007, 1 page.

"Apple—iPod + iTunes," at <http://www.apple.corn/itunes/>, printed Feb. 7, 2007, 2 pages.

Boswell, Wendy, "Loading 'Quintura—Search With Quintura, a Tag Cloud Search Engine'," at <http://websearch.about.com/od/dailywebsearchtips/qt/dnt0830.htm?p=1>, copyright 2007, About.com, Inc., printed Oct. 17, 2007, 1 page.

Egyhazy et al., "Intelligent Web Search Agents," at <http://csgrad.cs.vt.edu/~tplunket/article.html>, pp. 1-23, printed Dec. 20, 1999, 23 pages.

"FAQ," at <http://blog.pandora.com/faq/>, copyright 2005-2006, Pandora Media, Inc., printed Aug. 8, 2006, 20 pages.

"Frequently Asked Questions about Intermind's Patents," downloaded from <http://www.intermind.com/materials/patent_faq.html> on Feb. 27, 1998, 9 pages.

Gadrell, Charles M., "SocialAware: Context-Aware Multimedia Presentation via Mobile Social Networks," Masters Thesis, submitted to the Faculty of the Graduate School of the University of Colorado, directed by Dr. Richard Han, Department of Computer Science, 2008, found at <http://www.cs.colorado.edu/~rhan/Papers/Mike_Gartrell_CU_MS_thesis-final.pdf>, 42 pages.

Gibbon, John F. et al., "The Use of Network Delay Estimation for Multimedia Data Retrieval," IEEE Journal on Selected Areas in Communications, vol. 14, No. 7, Sep. 1996, pp. 1376-1387, 12 pages.

Hearst, Marti A. et al., "Tag Clouds. Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csdl2.computer.org/persagen/DLAbsToc.jsp?resourcePath=/dl/proceedings/&toc=comp/proceedings/hiccs/2008/3075/00/3075toc.xml&DOI=10.1109/HICSS.2008.422>, 10 pages.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

Hochmair, H.H. et al., "User Interface Design for Semantic Query Expansion in Geo-data Repositories," Angewandte Geoinformatik 2008—Beitrage zum 18, AGIT-Symposium Salzburg: Heidelberg: Wichmann, 2006, 10 pages.

Huhn, Mary, "Fed Up With Radio? Create Your Own Online Station," New York Post, at <http://pqasb.pqarchiver.com/nypost/access/68457933.html?FMT=FT&di. . .>, Nov. 22,1998, printed Oct. 13, 2009, 2 pages.

"InferNote is an exploration tool for your music collection," at <http://www.itweaks.com/infdoc/index.html>, copyrght 2004, otherslikeyou.com Inc., printed Feb. 7, 2007, 13 pages.

"Intermind Announces Approval of First Patent Application," dated Oct. 7, 1997, downloaded from <http://www.intermind.com/inside/press_rel/100797_allow.html>, 3 pages.

International Search Repon for PCT/GB01/03089 mailed Oct. 11, 2002, 3 pages.

Kaplan, Marc A., "IBM Cryptolopes TM, SuperDistribution and Digital Rights Management," found at <http://www.research.ibm.com/people/k/kaplan/cryptolope-docs/crypap.html> from the Internet Archive, copyright Dec. 30, 1996, IBM Corporation, printed Mar. 15, 2000, 7 pages.

Krigel, Beth Lipton, "Imagine Radio spinning off," CNET News, at <http://news.cnet.com/Imagine-Radio-spinning-off/2100-1033_3-213613.html>, Jul. 22, 1998, printed Oct. 13, 2009, 3 pages.

Krigel, Beth Lipton, "Radio features at center of Net law," CNET News, at <http://news.cnet.com/Radio-features-at-center-of-Net-law/2100-1033_3-214752.html>, Aug. 24, 1998, printed Oct. 15, 2009, 2 pages.

Lamantia, Joe, "Second Generation Tag Clouds," Feb. 23 2006, at <http://www.joelamantia.com/blog/archives/ideas/second_generation_tag_clouds.html>, copyright 2006, Joe Lamantia, printed Nov. 29, 2007, 19 pages.

Lehmann-Haupt, Rachel, "Library/Internet Radio; Listeners Take on Role of the Deejay," The New York Times, at <http://www.nytimes.com/1998/11/05/technology/library-internet-radio-lis. . .>, Nov. 5, 1998, printed Oct. 13, 2009, 2 pages.

Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=1 &sqr=On. . .>, Nov. 5, 1998, printed Oct. 15, 2009, 5 pages.

Lehmann-Haupt, Rachel, "Library/Internet Radio; Web Radio Expands Listening Horizons," The New York Times, at <http://www.nytimes.com/1998/11/05/technology/library-internet-radio-web-radio-expands-listening-horizons.html?scp=2&sq=. . .>, Nov. 5, 1993, printed Oct. 15, 2009. 5 pages.

Lingnau et al., "An HTTP-based Infrastructure for Mobile Agents," at http://www.w3.org/Conferences/WWW4/Papers/150/>, 1995, pp. 1-15, printed Dec. 20, 1999, 15 pages.

"liveplasma music, movies, search engine and discovery engine," at <http://www.liveplasma.com>, printed May 17, 2007, 1 page.

Madan, Sameer, "Search the Web without a headache," PC World (India), pp. 40-41, Feb. 1998, printed Dec. 20, 1999, 2 pages.

Mascia, J. and Reddy, S., "cs219 Project Report—Lifetrak: Music in Tune With Your Life," Department of Electrical Engineering, UCLA '06, Los Angeles, California, copyright 2006, ACM, 11 pages.

"Master's Projects of the KR&R Group," Faculty of Sciences, Vrije Universiteit, Amsterdam, URL unknown, publication date unknown, obtained on or prior to Apr. 22, 2009, 7 pages.

Merkel, Oliver et al., "Protecting VoD the Easier Way," Proceedings of the sixth ACM International Conference on Multimedia, Sep. 13-16, 1998, Bristo, United Kingdom, 1998, pp. 21-28, 8 pages.

"Music Artist Cloud," at <http://artistcloud.camaris.be/>, copyright 2007, mac, printed Oct. 17, 2007, 2 pages.

"MUSICSTRANDS.COM—Because Music is Social," brochure, copyright 2006, MusicStrands, Inc., 2 pages.

"MyStrands Labs: Patent-pending Technologies," at <http://labs.mystrands.com/patents.html>, printed Feb. 7, 2007, 5 pages.

Nickell, Joe Ashbrook, "Roll Your Own Radio," at <http://www.wired.com/print/culture/lifestyle/news/1998/08/14706>, Aug. 28, 1998, printed Oct. 13, 2009, 1 page.

Oliver N. and Kreger-Stickles, L., "PAPA: Physiology and Purpose-Aware Automatic Playlist Generation," In Proc. of ISMIR 2006, Victoria, Canada, Oct. 2006, 4 pages.

Oliver, N. and Flores-Mangas, F., "MPTrain: A Mobile, Music and Physiology-Based Personal Trainer," MobileHCI'06, Sep. 12-15, 2006, Helsinki, Finland, 8 page.

Pampalk, E. and Goto, M., "MusicSun: A New Approach to Artist Recommendation," In Proceedings of the 8th International Conference on Music Information Retrieval (ISMIR 2007), Vienna, Austria, Sep. 23-27, 2007, copyright 2007, Austrian Computer Society (OCG), found at <http://citeseerx.ist.psu.edu/viewdoc/download?doi=l0.1.1.69.1403&rep=rep1&type=pdf>, 4 pages.

"Pandora—Frequently Asked Questions," from <http:www.pandora.com>, obtained on or prior to Apr. 22, 2009, copyright 2005-2009, Pandora Media, Inc., 48 pages.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio—Listen to Free Internet Radio, Find New Music—The Music Genome Project," at <http://www.pandora.com/mgp>, copyright 2005-2007, Pandora Media, Inc., printed Oct. 28. 2007, 1 page.

Pike, S., "intuiTunes—Enhancing The Portable Digital Music Player Experience," Oct. 21, 2005, pp. 1-26.

Rouarch, Pierre, "The Cloud Search Beta," at <http://www.itoon3.com/thecloudsearch/aboutthecloudsearch.php>, copyright 2007, Pierre Rouarch, printed Oct. 17, 2007, 2 pages.

"Searching and Browsing. Radio Time," URL unknown, publication date unknown, obtained on or prior to Apr. 22, 2009, 3 pages.

Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm:>, copyright 1996, Seybold Publications Inc., 9 pages.

"Start Listening with Last.fm," at <http://www.last.fm/>, date unknown but may date back as early as 2002, 1 page.

* cited by examiner

TUNERSPHERE

RELATED APPLICATIONS

This application is a Continuation-in-Part (CIP) of U.S. patent application Ser. No. 12/192,682, U.S. Pat. No. 8,117,193, entitled TUNERSPHERE which was filed on Aug. 15, 2008, which is a Continuation-in-Part (CIP) of U.S. patent application Ser. No. 11/963,050, U.S. Pat. No. 8,060,525, entitled METHOD AND SYSTEM FOR GENERATING MEDIA RECOMMENDATIONS IN A DISTRIBUTED ENVIRONMENT BASED ON TAGGING PLAY HISTORY INFORMATION WITH LOCATION INFORMATION, which was filed on Dec. 21, 2007, both of which are hereby incorporated herein by reference in their entireties.

FIELD OF THE DISCLOSURE

The present disclosure relates to discovery of media content based on geographic location.

BACKGROUND

Systems for sharing and generating playlists are known. For example, Gracenote Playlist™ by Gracenote® of Emeryville, Calif., offers playlist generation technology for automatically generating digital music playlists that works in offline devices, including portable MP3 players, as well as desktop applications.

Gracenote Playlist Plus™ allows a user to generate a More Like This™ playlist by selecting one or more songs, albums, or artists as seeds. Gracenote Playlist then returns a mix of music that contains music from related artists and genres. This is accomplished by Gracenote Playlist Plus analyzing text data available in file tags, called metadata, and filenames of the music to link the music to an internal database of music information. Gracenote Playlist Plus uses Gracenote's proprietary metadata types, which include a genre system that has more than 1600 individual genre categories and associated relational data. The system lets Gracenote Playlist Plus find relationships between songs that may be missed by simpler systems. For example, a "Punk Pop" song may be more similar to a "Ska Revival" song than it might be to one belonging to another "Punk" sub-category, such as "Hardcore Punk."

Last.fm Ltd. is a UK-based internet radio and music community website. Using a music recommendation system called "Audioscrobbler", Last.fm™ builds a profile of each user's musical taste by recording details of all the songs the user listens to, either on streamed radio stations or on the user's own computer or music player. This information is transferred to Last.fm's database ("Scrobbled") via a plugin installed into the user's music player. The profile data is displayed on the user's Last.fm profile page for others to see. The site offers numerous social networking features and can recommend and play artists similar to the user's favorites. Users can create custom radio stations and playlists from any of the audio tracks in Last.fm's music library. A user can embed a playlist in their profile page to which others can listen, but the playlist needs to have at least 15 streamable tracks, each from different artists.

Similarly, U.S. Pat. No. 7,035,871 entitled "Method and Apparatus for Intelligent and Automatic Preference Detection of Media Content" provides a system for listening to music online by creating a preference profile for a user. When the user signs up for the service and provides details reflecting his preferences and his play history, a preference profile is generated and stored in a preference database. The system analyzes the stored profiles in the database and learns from the patterns it detects. The system recommends music to the user with attributes similar to the user's play history.

U.S. Patent Application Publication No. 2006/0143236 entitled "Interactive Music Playlist Sharing System and Methods" describes a community media playlist sharing system, where system users upload media playlists in real-time, which are automatically converted to a standardized format and shared with other users of the community. A playlist search interface module browses the database of media playlists and returns similar playlists of system users based on similarity of one or more of the following inputs from a system user: media identification information, media category information, media relations information, user information, or matching a plurality of media items on respective playlists. Based on the results of the playlist search interface module, the system returns a list of recommended playlists to the user.

Although conventional systems for generating playlists perform for their intended purposes, conventional systems suffer disadvantages that may render the results overbroad for the user's tastes. One disadvantage is that although conventional systems may take into account the playlists of other users, conventional systems fail to analyze the playlists of a specific group of users, and fail to consider peer group influences. For example, the music that a particular teenager listens to may be highly influenced by the music listened to by a group of the teenager's peers, such as his or her friends. A further disadvantage is that conventional systems fail to take into account the fact that the music tastes of a user may be influenced by his or her geographic location when generating playlists.

SUMMARY

The present disclosure relates to providing representative information for a geographic area of interest. In one embodiment, a media service tracks media interaction histories (e.g., play histories) for a number of users registered with the media service, where each media interaction history identifies media items interacted with by the corresponding user as well as the locations at which at least a subset of the media items were interacted with by the corresponding user. The media service receives a request from a requesting user for representative information for a geographic area of interest. In response to receiving the request, the media service determines representative information for the geographic area of interest based on at least a subset of the media interaction histories of the users and effects presentation of the representative information to the requesting user. In another embodiment, the geographic area of interest is divided into a number of sub-areas, and the representative information includes representative information for each sub-area of the geographic area of interest.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
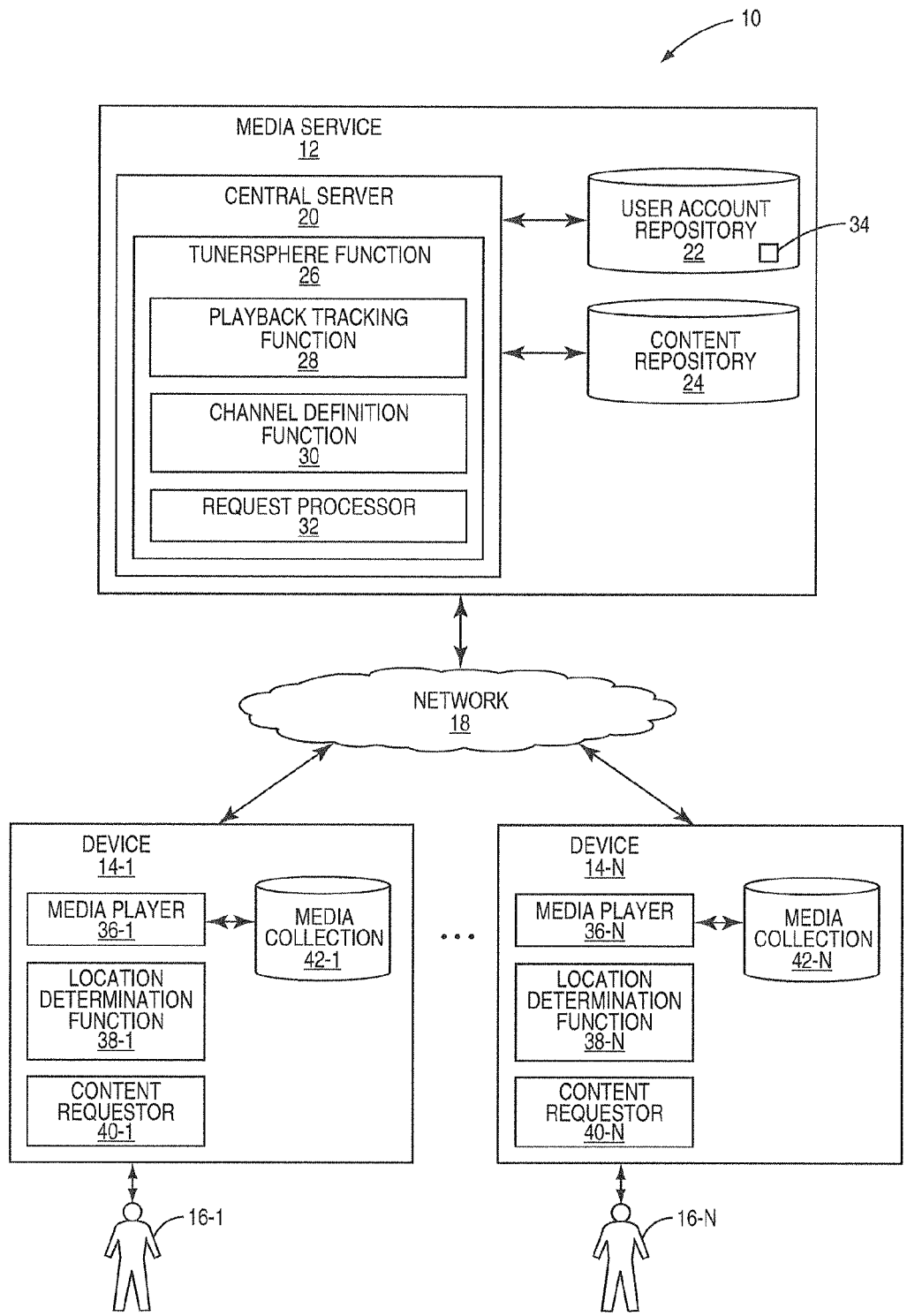
FIG. 1 illustrates a system for identifying media items played within one or more geographic areas of interest to a user according to one embodiment of the present disclosure.
Figure 7:
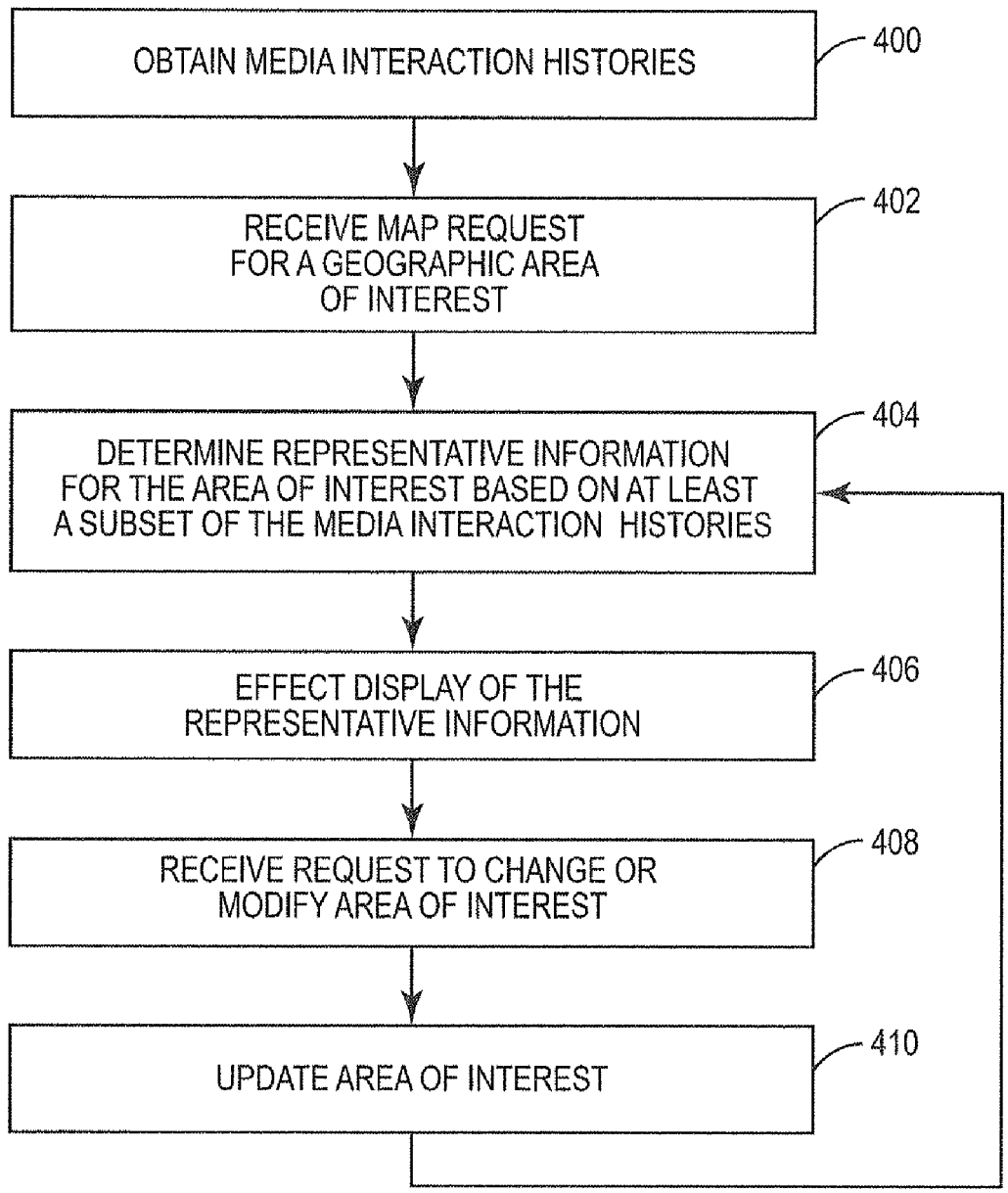
Figure 8:
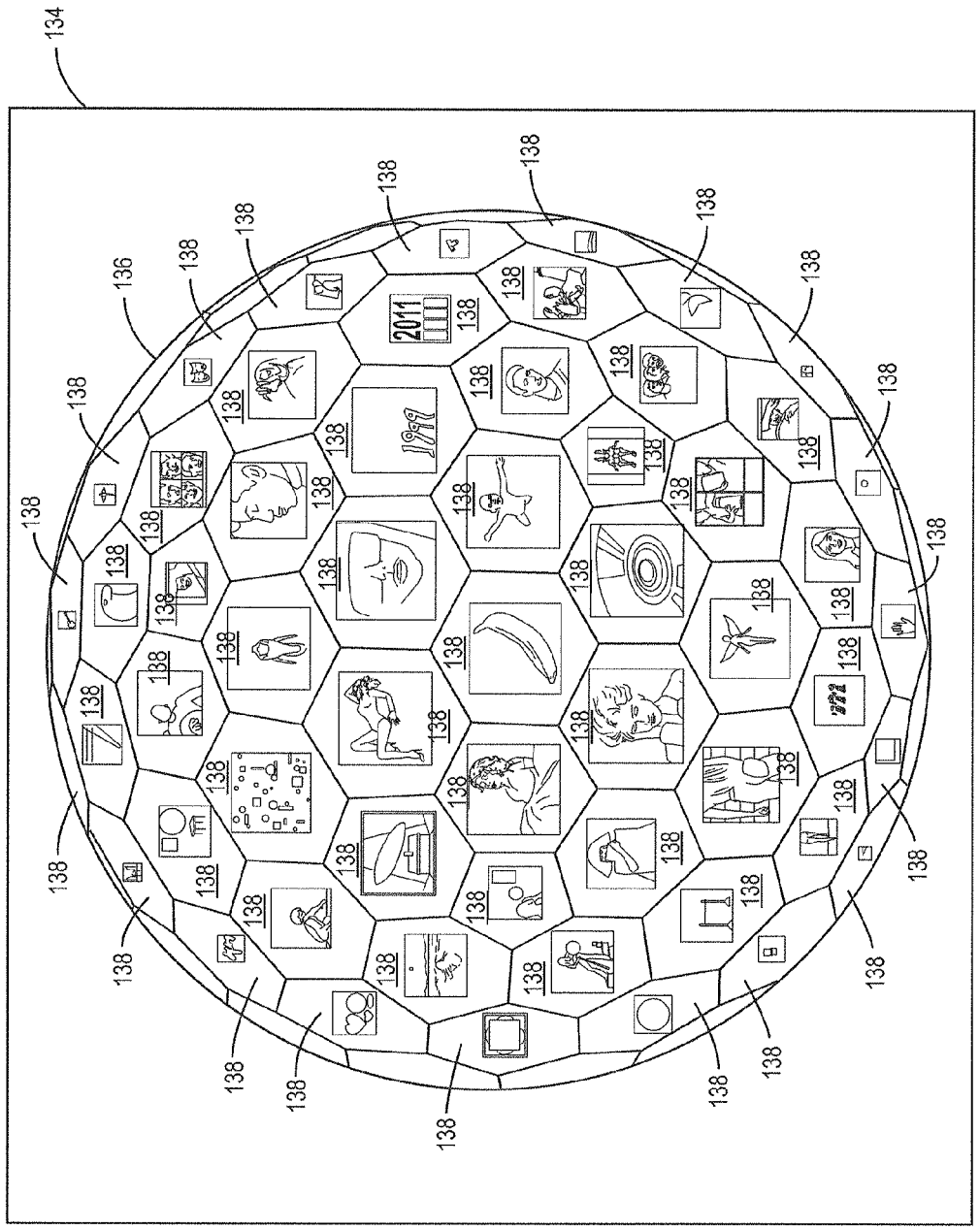
Figure 9:
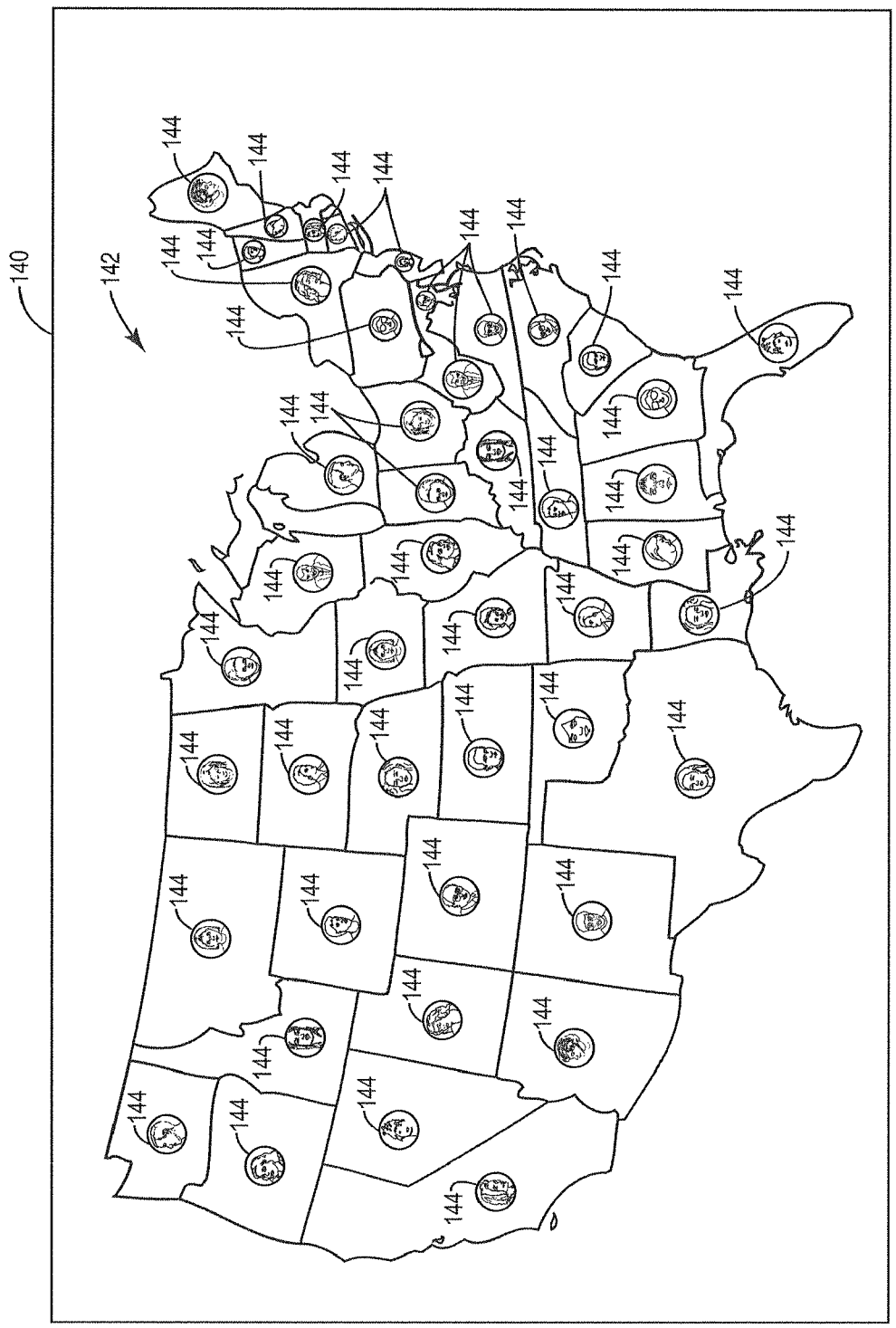
Figures 10, 11:
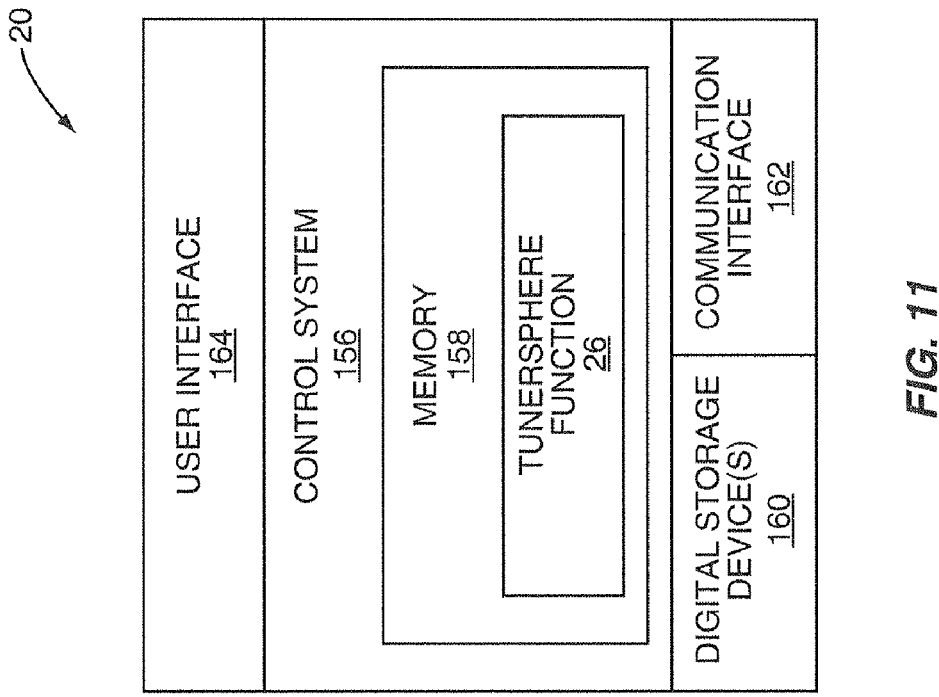

FIGS. 6A through 6I graphically illustrate an exemplary process by which a user defines multiple media channels and receives corresponding results according to one embodiment of the present disclosure;

FIG. 7 illustrates the operation of the media service of FIG. 1 according to another embodiment of the present disclosure;

FIG. 8 is an exemplary GUI for presenting representative information to a requesting user according to one embodiment of the present disclosure;

FIG. 9 is an exemplary GUI for presenting representative information to a requesting user according to another embodiment of the present disclosure;

FIG. 10 is a block diagram of the central server of FIG. 1 according to one embodiment of the present disclosure; and FIG. 11 is a block diagram of one of the devices of FIG. 1 according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 for identifying media items played within one or more geographic areas of interest to a user according to one embodiment of the present disclosure. In general, the system 10 includes a media service 12 and a number of devices 14-1 through 14-N having associated users 16-1 through 16-N. The devices 14-1 through 14-N are enabled to communicate with the media service 12 via a network 18 such as, but not limited to, the Internet. The media service 12 includes at least one central server 20 connected to the network 18, a user accounts repository 22, and a content repository 24. Note that each of the user accounts repository 22 and the content repository 24 may alternatively be hosted by the central server 20.

The central server 20 includes a tunersphere function 26, which may be implemented in software, hardware, or a combination thereof. In general, the tunersphere function 26 includes a playback tracking function 28, a channel definition function 30, and a request processor 32. The playback tracking function 28 operates to track playback of media items by the users 16-1 through 16-N at the devices 14-1 through 14-N. Preferably, the playback tracking function 28 maintains a play history for each of the users 16-1 through 16-N. Using the user 16-1 as an example, the play history of the user 16-1 includes an entry for each media item played by the user 16-1. Each entry includes information identifying the corresponding media item played by the user 16-1 such as, for example, a Globally Unique Identifier (GUID) of the media item, a fingerprint of the media item, a title of the media item, or the like. In addition, for at least a portion of the media items played by the user 16-1, the corresponding entries in the play history of the user 16-1 include information identifying locations at which the media items were played by the user 16-1. The information identifying the locations at which the media items were played by the user 16-1 may be, for example, latitude and longitude coordinates, a street address, a zip code, an area code, or the like. Still further, for at least a portion of the media items played by the user, the corresponding entries in the play history of the user 16-1 may include time stamps identifying times at which the corresponding media items were played by the user 16-1. In one embodiment, a time stamp may indicate a date on which the corresponding media item was played by the user 16-1 and a time of day. For example, a time stamp may be Jul. 23, 2008 at 11:17 A.M. EST.

In order to track the play histories of the users 16-1 through 16-N, the playback tracking function 28 obtains the play histories of the users 16-1 through 16-N from the devices 14-1 through 14-N. More specifically, in one embodiment, the devices 14-1 through 14-N provide playback information to the playback tracking function 28 automatically in response to playback of media items. Using the device 14-1 as an example, when the device 14-1 plays a media item for the user 16-1, the device 14-1 may automatically provide playback information including information identifying the media item, a current location of the device 14-1 which is the location at which the media item is played, and a time stamp. The device 14-1 may automatically provide the playback information once playback of the media item has been initiated, after a threshold amount of the media item has been played, or at the completion of playback of the media item.

In another embodiment, the devices 14-1 through 14-N automatically provide playback information to the playback tracking function 28 in a batch type process. Using the device 14-1 as an example, the device 14-1 may periodically provide playback information to the playback tracking function 28 for a number of media items played by device 14-1 since the device 14-1 last provided playback information to the playback tracking function 28. In this embodiment, the playback information includes information identifying the media items played by the device 14-1 since playback information was last sent, locations at which the media items were played, and time stamps identifying times at which the media items were played.

In yet another embodiment, the playback tracking function 28 may request playback information from the devices 14-1 through 14-N periodically or as otherwise desired. Again, using the device 14-1 as an example, the playback tracking function 28 may request playback information from the device 14-1. In response, the device 14-1 returns playback information for a number of media items played by the device 14-1 since the playback tracking function 28 last requested playback information from the device 14-1. Alternatively, the request from the playback tracking function 28 may define a time period such that the response from the device 14-1 includes playback information for media items played by the device 14-1 during that time period. Alternatively, the device 14-1 may return its entire play history to the playback tracking function 28 in response to the request.

The channel definition function 30 enables the users 16-1 through 16-N to define media channels for discovering media items played in defined geographic areas of interest to the users 16-1 through 16-N. Using the user 16-1 as an example, the channel definition function 30 enables the user 16-1 to define a media channel by selecting or otherwise defining one or more geographic areas of interest to the user 16-1. In addition, the user 16-1 may define a desired time window, one or more user-based criteria, one or more content-based criteria, or the like.

The request processor 32 generally operates to process media requests from the devices 14-1 through 14-N of the users 16-1 through 16-N. Continuing the example above, after the user 16-1 has defined the media channel, the user 16-1 may initiate a media request. Alternatively, the device 14-1 may automatically generate and send the media request to the media service 12. In response, the request processor 32 identifies one or more media items satisfying the media channel definition and provides a response to the device 14-1 of the user 16-1. In one embodiment, the response is a streaming media channel including the media items identified by the request processor 32. In another embodiment, the response is a list of media recommendations recommending the identified media items to the user 16-1. A media recommendation may include, for example, information identifying the recommended media item, the recommended media item, a preview of the recommended media item, a reference (e.g., URL) to the recommended media item, a reference (e.g., URL) to a preview of the recommended media item, or the like.

The user account repository 22 includes a user account 34 for each of the users 16-1 through 16-N. Using the user 16-1 as an example, the user account 34 of the user 16-1 includes the play history of the user 16-1 as maintained by the playback tracking function 28. Note that if the user 16-1 has access to multiple devices 14-1, then a separate play history may be maintained for the user 16-1 for each of the multiple devices 14-1 or a single aggregate play history may be maintained for the user 16-1 for all of the multiple devices 14-1. In this embodiment, the user account 34 of the user 16-1 also includes a media channel definition for each of one or more media channels defined by the user 16-1. A media channel definition includes information defining one or more geographic areas of interest. In addition, the media channel definition may include a desired time window, one or more user-based criteria, one or more content-based criteria, or any combination thereof. However, in an alternative embodiment, the media channel definitions may be stored at the device 14-1 of the user 16-1 and provided to the media service 12 in association with corresponding media requests.

The user account 34 of the user 16-1 may also include user preferences of the user 16-1, an online status of the user 16-1, collection information for the user 16-1, a friends list of the user 16-1, a group list of the user 16-1, and a user profile of the user 16-1. The user preferences may be defined by the user at, for example, the device 14-1 of the user 16-1 and then uploaded to the central server 20. Alternatively, the user 16-1 may interact with the central server 20 via, for example, a web interface such as a web browser on the device 14-1 to define his user preferences at the central server 20. As discussed below, the user preferences of the user 16-1 may be used to order or sort lists of media items for the user 16-1 based on expected desirability. For instance, media items identified by the request processor 32 may be scored based on the user preferences of the user 16-1 to provide a sorted list of media items. The user preferences of the user may include, for example, a weight or priority assigned to each of a number of categories such as user, genre, decade of release, and location/availability and each of a number of possible attributes of each of the categories. For an exemplary process for scoring media items based on user preferences defined as category weights and attribute weights, the interested reader is directed to U.S. Patent Application Publication No. 2008/0016205 entitled "P2P Network For Providing Real Time Media Recommendations," which is hereby incorporated herein by reference in its entirety.

The online status of the user 16-1 may be used to store information indicating whether the user 16-1 is currently online and logged into the media service 12. The collection information may include a record of media items in a media collection of the user 16-1 stored on the device 14-1. Note that in another embodiment, the user 16-1 may be associated with multiple devices 14-1 (e.g., home computer, work computer, portable media player, mobile smart phone, or the like), where each of the multiple devices 14-1 stores a different media collection of the user 16-1. As such, the collection information in the user account 34 of the user 16-1 may include a record of media items in each of the media collections of the user 16-1.

The friends list of the user 16-1 is a list of users with which the user 16-1 has a direct relationship in a contact list or buddy list, a list of users with which the user 16-1 has a direct or indirect relationship in a social network, or the like. The group list of the user 16-1 may define grouping of the users identified in the friends list of the user 16-1 (e.g., family, co-workers, friends, or the like).

The user profile of the user 16-1 may include demographic information describing the user 16-1 such as, for example, age, income level, gender, marital status, or the like. In addition, the user profile of the user 16-1 may include statistics about the media collection(s) of the user 16-1 such as, for example, an artist distribution, a genre distribution, and release year distribution. The artist distribution may include, for example, a number or percentage of media items in the media collection(s) of the user 16-1 performed by each of a number of artists. Likewise, the genre distribution may include, for example, a number or percentage of media items in the media collection(s) of the user 16-1 in each of a number of genres (e.g., music genres or video genres). The release year distribution may include, for example, a number or percentage of media items in the media collection(s) of the user 16-1 released in each of a number of years or range of years.

In this embodiment, the content repository 24 may include a number of media items known by the central server 20 and/or content descriptors for each of the number of media items known by the central server 20. The media items may be audio items such as songs, audio books, audio clips, or similar audio content; video items such as movies, television programs, music videos, video clips, or similar video content; or the like. The content descriptors may contain information identifying each media item known by the central server 20. For each media item, the content repository 24 may include one or more content descriptors such as, for example, a media fingerprint of the media item, a GUID of the media item, metadata for the media item, a reference (e.g., URL) to the media item in local or remote storage, or the like. Using a song as an example, the metadata for the song may include, for example, a title of the song, an artist of the song, an album on which the song was released, a date on which the song was released, a genre of the song, or the like.

Each of the devices 14-1 through 14-N may be, for example, a personal computer, a mobile smart phone having media playback capabilities, a portable media player having network capabilities, a gaming console having network and media playback capabilities, a set-top box, or the like. The device 14-1 includes a media player 36-1, a location determination function 38-1, and a content requestor 40-1, each of which may be implemented in software, hardware, or a combination thereof. The media player 36-1 operates to play media items from a media collection 42-1 of the user 16-1 stored locally at the device 14-1 or media items streamed to the device 14-1 from the media service 12.

Either the media player 36-1 or the content requestor 40-1 provide playback information to the playback tracking function 28 of the tunersphere function 26 identifying media items played by the user 16-1 and locations at which the media items were played. In addition, the playback information may include timestamps defining times at which the media items were played. In one embodiment, in response to playback of a media item by the media player 36-1, the media player 36-1 or the content requestor 40-1 automatically provides corresponding playback information to the media service 12. In another embodiment, the media player 36-1 or the content requestor 40-1 periodically provides playback information to the media service 12 for media items played by the media player 36-1 in the time period since playback information was last sent to the media service 12. As a final example, the playback tracking function 28 may periodically request playback information from the device 14-1.

The location determination function 38-1 generally operates to obtain the location of the device 14-1, where the location of the device 14-1 is then included in the playback information provided to the media service 12 as discussed above. In general, the location determination function 38-1 may be any software and/or hardware application enabled to determine or otherwise obtain the location of the device 14-1. As an example, the location determination function 38-1 may be a Global Positioning System (GPS) receiver. As another example, the device 14-1 may be a mobile telephone where mobile base station triangulation is utilized to determine the location of the device 14-1. The location determination function 38-1 may then obtain the location of the device 14-1 from the mobile telecommunications network periodically or as needed.

In this embodiment, the content requestor 40-1 interacts with the channel definition function 30 of the tunersphere function 26 to enable the user 16-1 to define one or more media channels. In addition, either automatically or when initiated by the user 16-1, the content requestor 40-1 issues a media request for a media channel to the tunersphere function 26 of the media service 12. The content requestor 40-1 may also operate to process responses received from the request processor 32 of the tunersphere function 26 in response to media requests. In this embodiment, the content requestor 40-1 may be implemented as, for example, a standard web browser having web access to the tunersphere function 26, a plug-in for a web browser, a stand-alone application, or the like.

It should be noted that in an alternative embodiment, some of the functionality of the tunersphere function 26 may be implemented on the devices 14-1 through 14-N. For example, the channel definition function 30 may alternatively be implemented at the device 14-1 as part of, for example, the content requestor 40-1. The media channel definitions may then be stored locally at the device 14-1 and provided to the media service 12 as part of corresponding media requests or in association with corresponding media requests. Alternatively, the media channel definitions may be uploaded to the central server 20 and stored in the user account 34 of the user 16-1 where media requests issued by the content requestor 40-1 may reference the corresponding media channel definition.

Like the device 14-1, the devices 14-2 through 14-N include media players 36-2 through 36-N, location determination functions 38-2 through 38-N, content requestors 40-2 through 40-N, and media collections 42-2 through 42-N, respectively. The media players 36-2 through 36-N, the location determination functions 38-2 through 38-N, the content requestors 40-2 through 40-N, and the media collections 42-2 through 42-N are substantially the same as the corresponding elements of the device 14-1. As such, the details regarding the media players 36-2 through 36-N, the location determination functions 38-2 through 38-N, the content requestors 40-2 through 40-N, and the media collections 42-2 through 42-N are not repeated.

Figure 2:
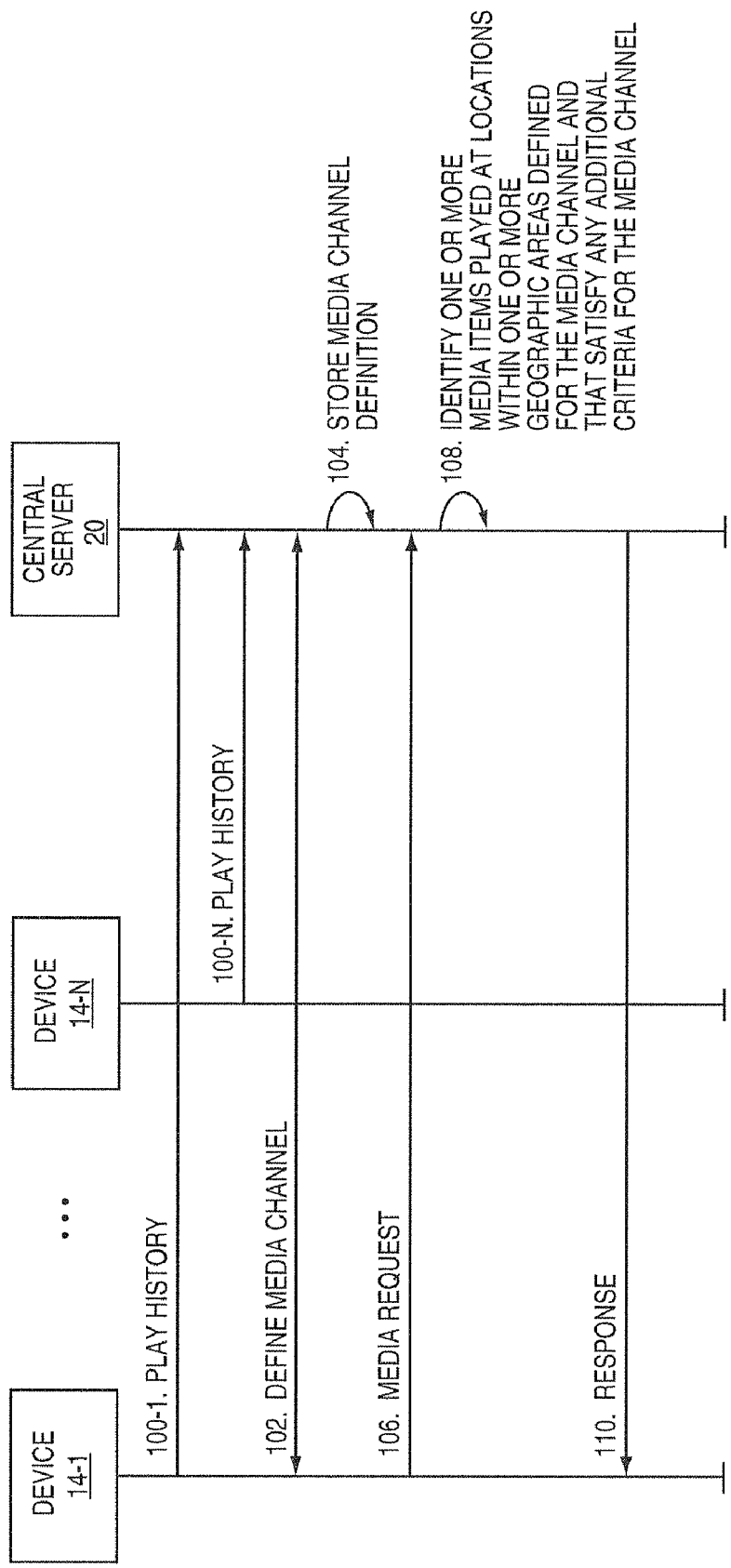
FIG. 2 illustrates the operation of the system of FIG. 1 according to one embodiment of the present disclosure.

FIG. 2 illustrates the operation of the system 10 of FIG. 1 according to one embodiment of the present disclosure. First, the devices 14-1 through 14-N provide the play histories of the users 16-1 through 16-N to the central server 20 (steps 100-1 through 100-N). As discussed above, the play histories of the users 16-1 through 16-N identify media items played by the users 16-1 through 16-N, locations at which the users 16-1 through 16-N played the media items, and, in some embodiments, times at which the users 16-1 through 16-N played the media items.

In this example, via the device 14-1, the user 16-1 interacts with the channel definition function 30 of the tunersphere function 26 hosted by the central server 20 to define a media channel (step 102). Again, the user 16-1 generally defines the media channel by selecting or otherwise defining one or more geographic areas of interest for the media channel. In addition, the user 16-1 may define a time window of interest, one or more user-based criteria, one or more content-based criteria, or any combination thereof. The media channel definition is then stored by the central server 20 in the user account 34 of the user 16-1 (step 104).

Next, the content requestor 40-1 of the device 14-1 sends a media request for the media channel to the central server 20 (step 106). In response, the request processor 32 obtains the media channel definition from the user account 34 of the user 16-1 and processes the play histories of the other users 16-2 through 16-N, or some select subset thereof, to identify one or more media items that were played within the one or more geographic areas of interest for the media channel and that satisfy any additional criteria for the media channel (step 108). In general, the request processor 32 identifies the one or more media items based on the media channel definition which includes information defining one or more geographic areas of interest and, optionally, one or more of the following: a time window, one or more user-based criteria, and one or more content-based criteria. More specifically, in a first exemplary embodiment, the media channel is defined by one or more geographic areas of interest. As such, the request processor 32 may process the play histories of all of the other users 16-2 through 16-N to identify one or more media items that were played at locations within the one or more geographic areas of interest for the media channel.

In a second exemplary embodiment, the media channel definition includes information defining one or more geographic areas of interest and a time window. As such, the request processor 32 may process the play histories of the other users 16-2 through 16-N to identify one or more media items that were played at locations within the one or more geographic areas of interest for the media channel during the defined time window for the media channel. The time window may be relative to a current time. For example, the time window may be "within the last 30 days" or "within the last 1 hour." The time window may alternatively be a static time window. For example, the static time window may be "the year 2008" or "June of 2008."

In a third exemplary embodiment, the media channel definition includes information defining one or more geographic areas of interest and one or more user-based criteria. As such, the request processor 32 may process the play histories of at least a subset of the other users 16-2 through 16-N to identify one or more media items that were played at locations within the one or more geographic areas of interest for the media channel by users satisfying the one or more user-based criteria. The user-based criteria may include, for example, a friends list of the user 16-1, a group of friends of the user 16-1, one or more profile matching criteria, a social distance criterion, a status criterion, one or more keyword criteria, or the like. The friends list may be used by the request processor 32 such that the one or more identified media items are media items played at locations within the one or more geographic areas of interest for the media channel by other users in the friends list of the user 16-1. Similarly, the group of friends may be used by the request processor 32 such that the one or more identified media items are media items played at locations within the one or more geographic areas of interest for the media channel by other users in the group of friends of the user 16-1.

The profile matching criteria may be defined such that media items played by users having user profiles that match the user profile of the user 16-1 at least to a defined degree are selected. The profile matching criteria may, for example, define one or more user profile elements that must match or match at least to a defined degree, define a threshold number of user profile elements that must match or at least match to a defined degree before two user profiles are determined to be matching, or the like. As such, the one or more media items identified by the request processor 32 are media items played at locations within the one or more geographic areas of interest for the media channel by other users having user profiles that match the user profile of the user 16-1 at least to a defined degree.

The social distance criterion may define a maximum social distance (e.g., maximum degree of separation) such that media items played by other users within the maximum social network distance from the user 16-1 in a social network are selected. As such, the one or more media items identified by the request processor 32 are media items played at locations within the one or more geographic areas of interest for the media channel by other users located within the maximum social distance from the user 16-1 in the social network.

The status criterion may be defined such that media items played by other users that are currently online are selected. As such, the one or more media items identified by the request processor 32 are media items played at locations within the one or more geographic areas of interest for the media channel by other users that are currently online.

In one embodiment, users such as the users 16-1 through 16-N may be enabled to tag other users with keywords. As such, one or more keyword criteria may be defined such that media items played by users tagged with keywords that satisfy the keyword criteria are selected. As such, the one or more media items identified by the request processor 32 are media items played at locations within the one or more geographic areas of interest for the media channel by users that have been tagged with keywords that satisfy the one or more keyword criteria.

In a fourth exemplary embodiment, the media channel definition includes information defining one or more geographic areas of interest and one or more content-based criteria. As such, the request processor 32 may process the play histories of at least a subset of the other users 16-2 through 16-N to identify one or more media items that were played at locations within the one or more geographic areas of interest for the media channel and that satisfy the one or more content-based criteria. The content-based criteria may include, for example, seed media item information, a performance criterion, a creator criterion, one or more metadata criteria, an age criterion, one or more keyword criteria, one or more feature criteria, a usage criterion, or the like.

The seed media item criteria may be information describing a seed media item. For example, if the seed media item is a seed song, the information describing the seed song may be metadata for the seed song such as an artist of the seed song, an album on which the seed song was released, a year of release of the seed song, a decade of release of the seed song, a genre of the seed song, one or more keywords appearing in the title and/or lyrics of the seed song, or the like. In addition or alternatively, the information describing the seed song may be one or more features of the seed song such as, for example, a tempo of the seed song, beats-per-minute of the seed song, or the like. As such, the one or more media items identified by the request processor 32 are media items played at locations within the one or more geographic areas of interest for the media channel and that match the information describing the seed media item at least to a defined degree.

The performance criterion may be defined such that the one or more media items identified by the request processor 32 having a live performance location (e.g., upcoming concert or live performance location) within a defined proximity of a current location of the user 16-1 are selected. As such, the one or more media items identified by the request processor 32 are media items played at locations within the one or more geographic areas of interest for the media channel and that have upcoming live performance locations within the defined proximity of the user 16-1.

The creator criterion selects media items having artists or other persons that created the media items if the artists or other persons that created the media items are located within a defined proximity of a current location of the user 16-1. The creator of a media item is in proximity to the user 16-1 if the creator is within a defined geographic distance from the user 16-1.

The one or more metadata criteria may be defined such that media items having metadata that satisfies the metadata criteria are selected. For songs, the metadata criteria may define, for example, one or more desired music genres, one or more desired artists, one or more desired dates of release, one or more desired decades of release, one or more music genres that are not desired, one or more artists that are not desired, one or more dates of release that are not desired, one or more decades of release that are not desired, or the like. Likewise, similar metadata criteria may be defined for other types of audio and video media items. As such, the one or more media items identified by the request processor 32 are media items played at locations within the one or more geographic areas of interest for the media channel and that have metadata that satisfies the one or more metadata criteria.

The age criterion may be defined such that media items that have a time lapse since the media items were last played that matches the age criterion are selected. The age criterion may be a time window relative to the current time such as, for example, "last played within previous hour." The age criterion may alternatively define a time-window relative to a static time such as, for example, "last played after Jul. 22, 2008." As such, the one or more media items identified by the request processor 32 are media items played at locations within the one or more geographic areas of interest for the media channel and that satisfy the age criterion.

In one embodiment, users such as the users 16-1 through 16-N may be enabled to tag media items with keywords. As such, one or more keyword criteria may be defined such that media items that have been tagged with keywords satisfying the keyword criteria are selected. As such, the one or more media items identified by the request processor 32 are media items played at locations within the one or more geographic areas of interest for the media channel and that have been tagged with keywords that satisfy the one or more keyword criteria.

The one or more feature criteria may be defined such that media items having metadata that satisfies the feature criteria are selected. Using features of a song as an example, the feature criteria may define, for example, one or more desired tempos, one or more desired beats-per-minute values, one or more tempos that are not desired, one or more beats-per-minute values that are not desired, or the like. As such, the one or more media items identified by the request processor 32 are media items played at locations within the one or more geographic areas of interest for the media channel and that have metadata that satisfies the one or more feature criteria.

The usage criterion may be defined such that media items played more than a threshold number of times within the one or more geographic areas of interest or more than a threshold number of times by a particular user are selected. As such, the one or more media items identified by the request processor 32 are media items played at locations within the one or more geographic areas of interest for the media channel and that satisfy the usage criterion.

Once the one or more media items for the media channel are identified, the request processor 32 of the tunersphere function 26 hosted by the central server 20 sends a response to the media request to the device 14-1 of the user 16-1 (step 110). In one embodiment, the response is a streaming media channel including the one or more media items identified by the request processor 32. In another embodiment, the response is a list of media recommendations identifying the one or more media items identified by the request processor 32. Again, a media recommendation may include, for example, information identifying the recommended media item, the recommended media item, a preview of the recommended media item, a reference (e.g., URL) to the recommended media item, a reference (e.g., URL) to a preview of the recommended media item, or the like.

Note that, in one embodiment, once a media request has been issued, the request processor 32 may continually update the response. More specifically, as the play histories of the other users 16-2 through 16-N are updated, the request processor 32 may update the response provided to the device 14-1 of the user 16-1 to include any additional media items played by the other users 16-2 through 16-N that satisfy the requirements of the media channel. As an example, if the response provided by the request processor 32 is a streaming media channel, the streaming media channel may be continually or periodically updated to add media items to the media channel that have been played in the one or more geographic areas of interest for the media channel and that satisfy any additional criteria for the media channel. As another example, if the response provided by the request processor 32 is a list of media recommendations, the request processor 32 may continually or periodically update the list of media recommendations to include media recommendations for additional media items that have been played in the one or more geographic areas of interest for the media channel and that satisfy any additional criteria for the media channel.

Figure 3:
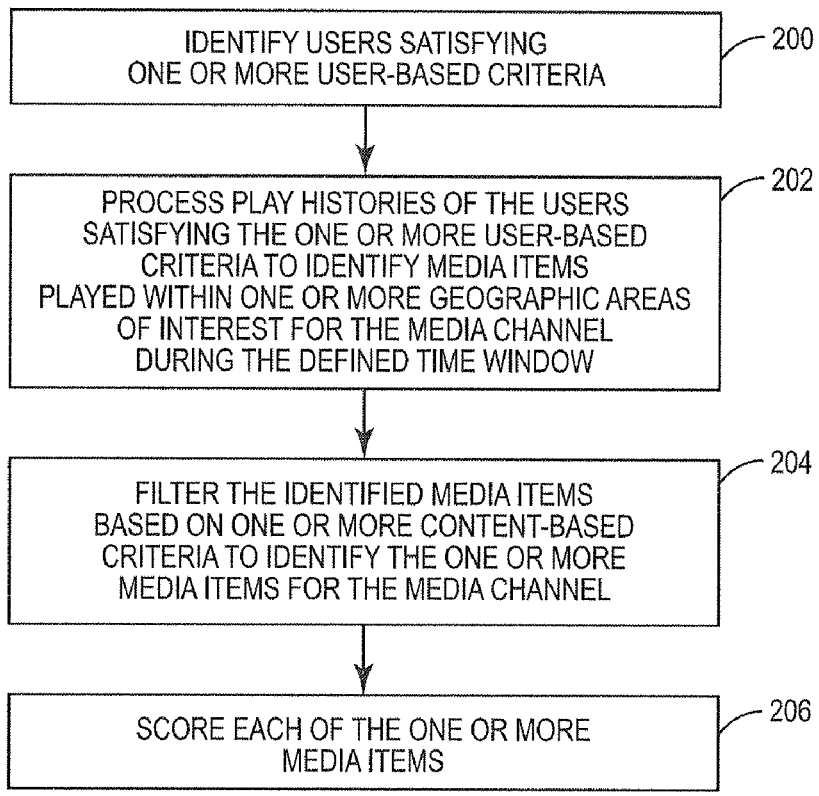
FIG. 3 is a flow chart illustrating a more detailed process for identifying media items played within one or more geographic areas of interest according to one embodiment of the present disclosure.

FIG. 3 is a more detailed flow chart illustrating step 108 of FIG. 2 according to one embodiment of the present disclosure. In this example, the media channel definition includes information defining one or more geographic areas of interest, a time window, one or more user-based criteria, and one or more content-based criteria. However, as discussed above, the present disclosure is not limited thereto. First, the request processor 32 of the tunersphere function 26 hosted by the central server 20 identifies users from the other users known to the media service 12, which for this example are the other users 16-2 through 16-N, that satisfy the one or more user-based criteria (step 200). Next, the request processor 32 processes the play histories of the users that satisfy the user-based criteria to identify media items played in the one or more geographic areas of interest for the media channel during the defined time window (step 202). The request processor 32 then filters the identified media items based on the one or more content-based criteria to identify the one or more media items for the media channel (step 204).

Optionally, the request processor 32 may score the one or more media items identified for the media channel based on the user preferences of the requesting user, which in this example is the user 16-1 (step 206). In addition, as discussed below, the scores of the media items may further be a function of weights assigned to the one or more geographic areas of interest. The scores may then be used to prioritize the media items identified for the media channel when generating and sending the response to the device 14-1 of the user 16-1. For example, if the response is a streaming media channel, the media items may be provided in the streaming media channel in an order defined by the scores of the media items. As another example, if the response is a list of media recommendations, the scores may be provided in association with the media recommendations as an indication of an expected desirability of the media items to the user 16-1.

Figure 4:
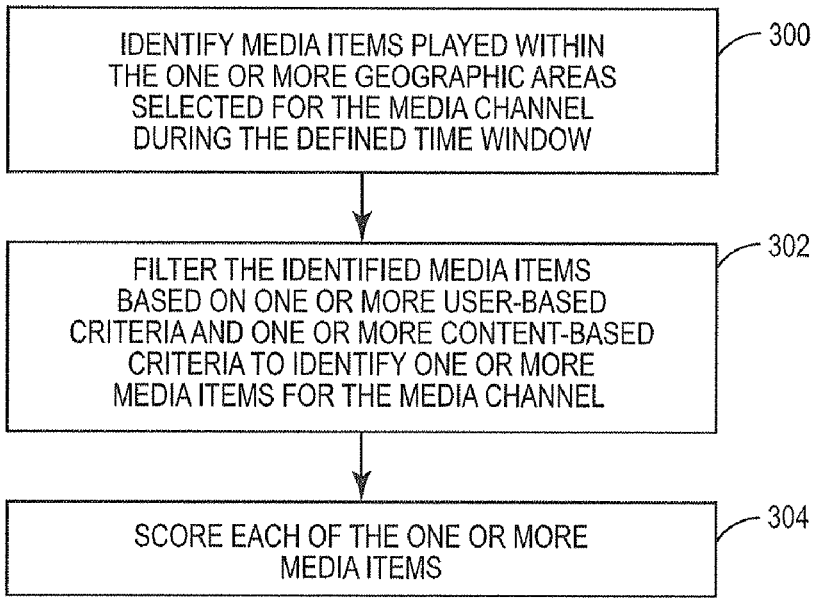
FIG. 4 is a flow chart illustrating a more detailed process for identifying media items played within one or more geographic areas of interest according to another embodiment of the present disclosure.

FIG. 4 is a more detailed flow chart illustrating step 108 of FIG. 2 according to another embodiment of the present disclosure. In this example, the media channel definition includes information defining one or more geographic areas of interest, a time window, one or more user-based criteria, and one or more content-based criteria. However, as discussed above, the present disclosure is not limited thereto. First, the request processor 32 processes the play histories of the users known to the media service 12 to identify media items played in the one or more geographic areas of interest for the media channel during the defined time window (step 300). Next, the request processor 32 of the tunersphere function 26 hosted by the central server 20 filters the identified media items based on the one or more user-based criteria and the one or more content-based criteria to identify the one or more media items for the media channel (step 302).

Optionally, the request processor 32 may score the one or more media items identified for the media channel based on the user preferences of the requesting user, which in this example is the user 16-1 (step 304). In addition, as discussed below, the scores of the media items may further be a function of weights assigned to the one or more geographic areas of interest. Again, the scores may then be used to prioritize the media items identified for the media channel when generating and sending the response to the device 14-1 of the user 16-1. For example, if the response is a streaming media channel, the media items may be provided in the streaming media channel in an order defined by the scores of the media items. As another example, if the response is a list of media recommendations, the scores may be provided in association with the media recommendations as an indication of an expected desirability of the media items to the user 16-1.

Figure 5:
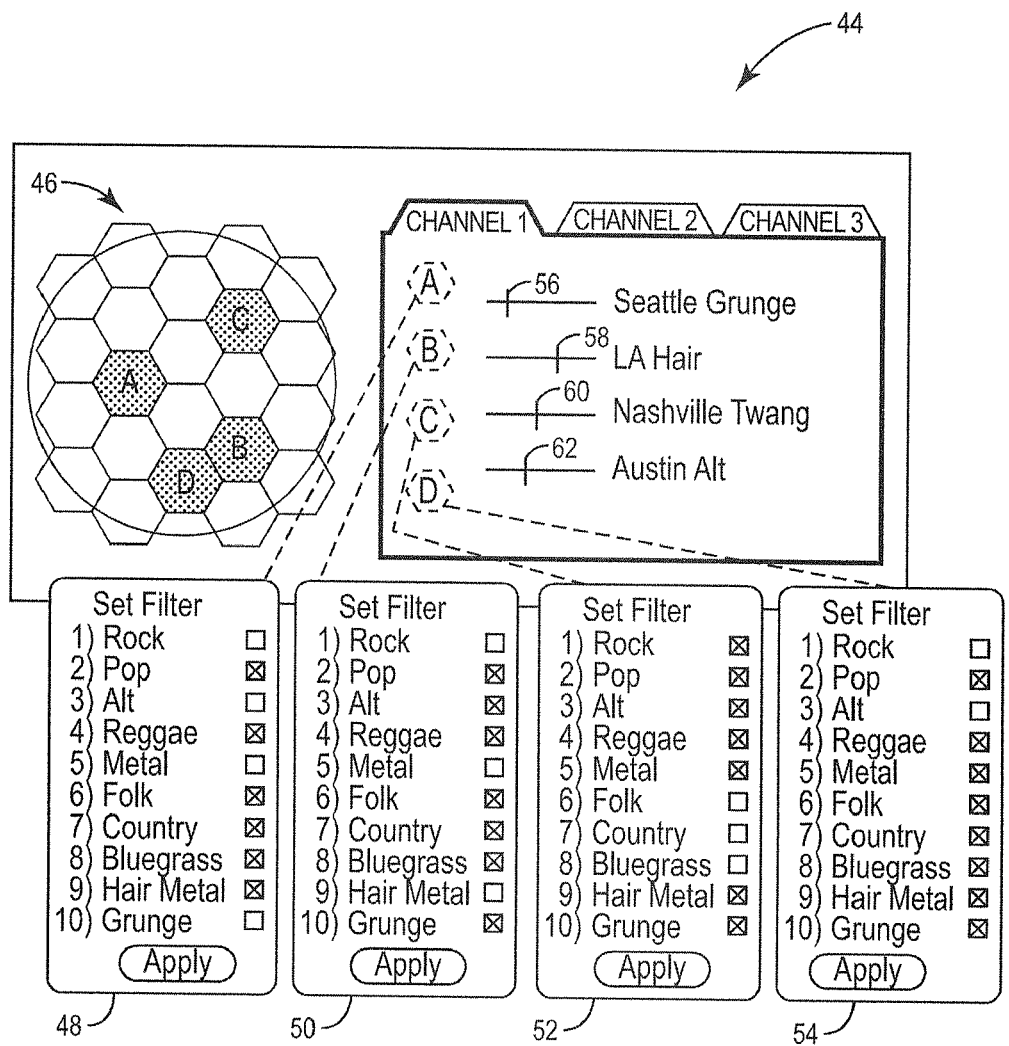
FIG. 5 illustrates an exemplary Graphical User Interface (GUI) enabling a user to define one or more media channels according to one embodiment of the present disclosure.

FIG. 5 illustrates an exemplary Graphical User Interface (GUI) 44 enabling a user to define one or more media channels according to one embodiment of the present disclosure. In general, the GUI 44 includes a geographic area selection tool 46. In this example, the geographic area selection tool 46 includes a map of an overall geographic area from which the user may select, which in this case is a map of the Earth. In addition, the map is segmented into a number of cells, which in this example are hexagons. The user may then select one or more geographic areas of interest for the media channel by selecting corresponding cells on the map. In this example, the user has selected four geographic areas. Specifically, the user has selected cell A as a first geographic area, cell B as a second geographic area, cell C as a third geographic area, and cell D as a fourth geographic area. Note that in this example, each of the geographic areas is defined by a single cell. However, the present disclosure is not limited thereto. Each geographic area may be defined by one or more cells.

In addition to the geographic area selection tool 46, the GUI 44 includes criteria selection tools 48 through 54 enabling the user to select additional criteria for the media channel for each of the defined geographic areas. In this example, the criteria selection tool 48 enables the user to select one or more music genres to be filtered or removed when identifying media items for the media channel. So, for instance, when identifying media items for the media channel, songs from the Pop, Reggae, Folk, Country, Bluegrass, and Hair Metal genres that were played in the geographic area defined by cell A are not selected for the media channel. However, in other embodiment, the criteria selection tools 48 through 54 may enable the user to select other types of content-based criteria or user-based criteria and/or a time window for the media channel.

The GUI 44 may also enable the user to assign weights to each of the geographic areas for the media channel. In this example, slider bars 56 through 62 enable the user to assign weights to the geographic areas defined by cells A through D, respectively. In one embodiment, the weights assigned to the geographic areas as well as user preferences of the user may be used to score the media items identified by the request processor 32 for the media channel. The media items may then be prioritized based on their scores, media items having scores less than a threshold may be filtered, or the like. In another embodiment, the weights assigned to the geographic areas may be used to determine a number of media items selected for each of the geographic areas such that more media items are selected for geographic areas having higher weights.

Figure 6A:
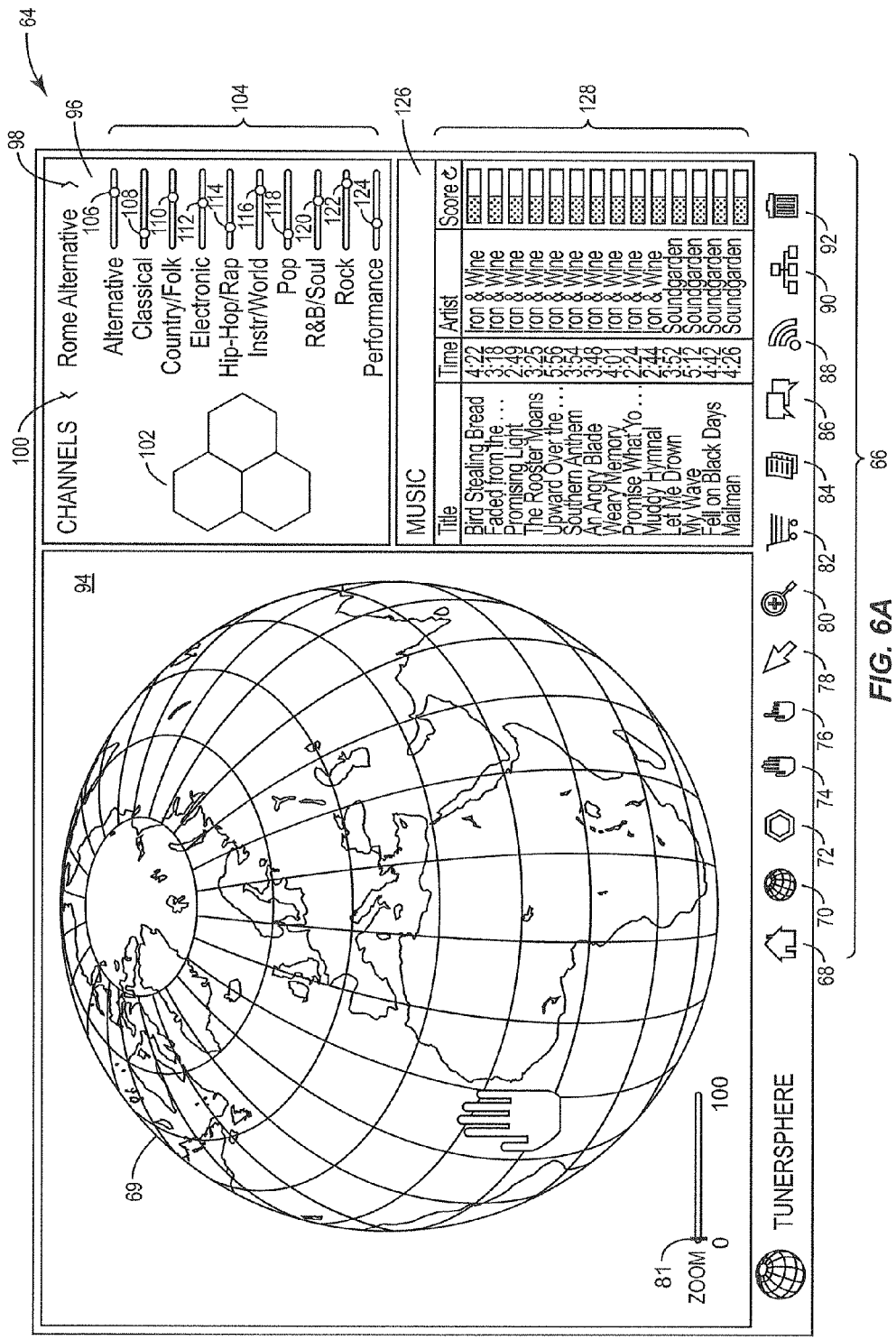

FIGS. 6A through 6I graphically illustrate the operation of the system 10 of FIG. 1 according to an exemplary embodiment of the present disclosure. FIG. 6A illustrates a GUI 64 enabling a user to define one or more media channels and receive a response from the media service regarding one or more media items identified for the one or more media channels. The GUI 64 includes a toolbar 66, which includes a number of tools 68 through 92. A home tool 68 takes the user to a base screen, which in this example is a full view of a map 69 of the Earth. More specifically, in this example, the map 69 is a globe of the Earth. A globe tool 70 enables the user to select among multiple views of the map 69 of the Earth such as a satellite view, an abstracted view, a political boundaries view, or the like. The globe tool 70 may also enable the user to save a favorite view. A hexagon tool 72 toggles a hexagon overlay on or off in order to enable the user to select desired geographic areas by selecting corresponding hexagons overlaid onto the map 69. The hexagon tool 72 may also enable the user to set a size of the hexagons relative to a current zoom level on the map 69. Note that hexagons are exemplary; other shapes may be used.

A hand tool 74 enables the user to grab and rotate the map 69, or globe, of the Earth. A hand pointer tool 76 enables the user to select desired geographic areas by, for example, selecting corresponding hexagons overlaid onto the map 69, by drawing arbitrary shapes on the map 69, or the like. A pointer tool 78 enables the user to click and drag selections between the multiple sections of the GUI 64. A magnifier tool 80 enables the user to magnify the map 69 independently from zooming in or out of the map 69 using a zoom tool 81. A shopping cart tool 82 enables the user to select discovered media items for subsequent purchase. A notes tool 84 enables the user to attach comments to media items and/or media channels. A chat tool 86 enables the user to initiate a chat session with other users of the media service 12. A transmit tool 88 enables the user to enable or disable sharing of his play history. A log-in tool 90 enables the user to login to and logout of the media service 12. A trash tool 92 is a general purpose trash function that enables the user to discard media channels, selected geographic areas in a media channel, criteria defined for a media channel, or the like.

In this example, the GUI 64 includes a first section 94, which includes the map 69 of the Earth. The GUI 64 also includes a second section 96, which enables the user to define and access a number of media channels defined by the user. More specifically, in this example, the user is currently viewing a "Rome Alternative" media channel previously defined by the user. The user may select a forward button 98 or a reverse button 100 to browse through additional media channels. Once the user has browsed to a last or first media channel, the user may select the forward button 98 or the reverse button 100, respectively, to cause the creation of a new media channel.

In this example, the "Rome Alternative" media channel has a defined geographic area 102 and a number of criteria 104. While the criteria may include a time window, one or more user-based criteria, and/or one or more content-based criteria, in this example, the criteria 104 include a number of content-based criteria which are more specifically a number of music genres. Further, for each music genre, the user has defined a corresponding weight using slider bars 106 through 124. Note that in this example, rather than selecting which music genres to include or exclude as was done in the exemplary embodiment of FIG. 5, the user is enabled to defined weights for each of the music genres. Then, in order to filter media items played within the geographic area 102, the media items may be scored as a function of the weights set by the slider bars 106 through 124. Media items having scores less than a threshold may then be filtered. Alternatively, the weights assigned to the music genres may control a number or percentage of the media items identified for the media channel for each genre or a maximum number or percentage of the media items identified for the media channel for each genre.

The GUI 64 also includes a third section 126, which is used to display a list 128 of the one or more media items identified by the request processor 32 of the tunersphere function 26 for the selected media channel. In addition, if scores are generated for the media items, the list 128 may also include the scores of the media items. As discussed above, in one embodiment, the response from the request processor 32 of the tunersphere function 26 is a streaming media channel. As such, the list 128 may include a list of media items included in the streaming media channel. The user may be enabled to skip forward or backward in the stream by selecting corresponding media items from the list 128. If the user desires to add one of the media items to his shopping cart, the user may drag the corresponding entry from the list 128 to the shopping cart tool 82. In another embodiment, the list 128 is a list of media recommendations provided for the media channel. The user may add desired media items from the list 128 to his shopping cart using the shopping cart tool 82.

Figure 6B:
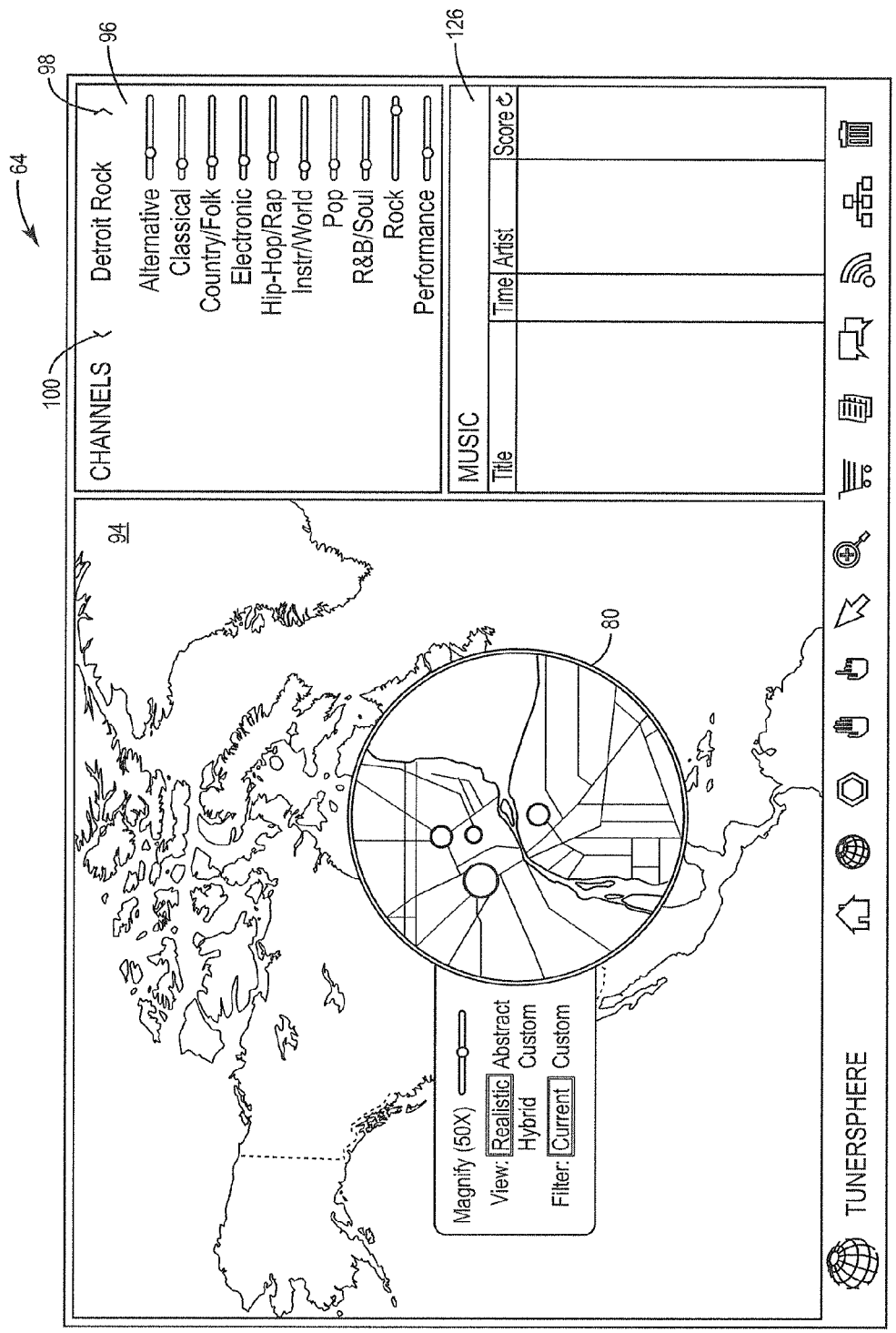

FIG. 6B illustrates a situation where the user is defining a new media channel, which in this example is a "Detroit Rock" media channel. The user has already defined weights for a number of music genres for the "Detroit Rock" media channel and is in the process of selecting a geographic area of interest for the "Detroit Rock" media channel. The user has rotated the map 69 and zoomed in on North America. The user has then activated the magnifier tool 80. Note that the magnification of the magnifier tool 80 is set independently from the zoom level set by the zoom tool 81. The magnifier tool 80 may also enable the user to set a desired view for the zoom tool 81 such as, for example, realistic (i.e., satellite), abstract, hybrid, or custom view. The user may also be enabled to set a filter to "current" or "custom." When the filter for the magnifier tool 80 is set to "current," then the magnifier tool 80 shows the positions of users that have played media items satisfying the current criteria for the "Detroit Rock" media channel or locations at which media items satisfying the current criteria for the "Detroit Rock" media channel have been played. Alternatively, the user may define a "custom" filter such that the magnifier tool 80 shows the positions of users that have played media items satisfying the custom filter or locations at which media items satisfying the custom filter have been played.

Figure 6C:
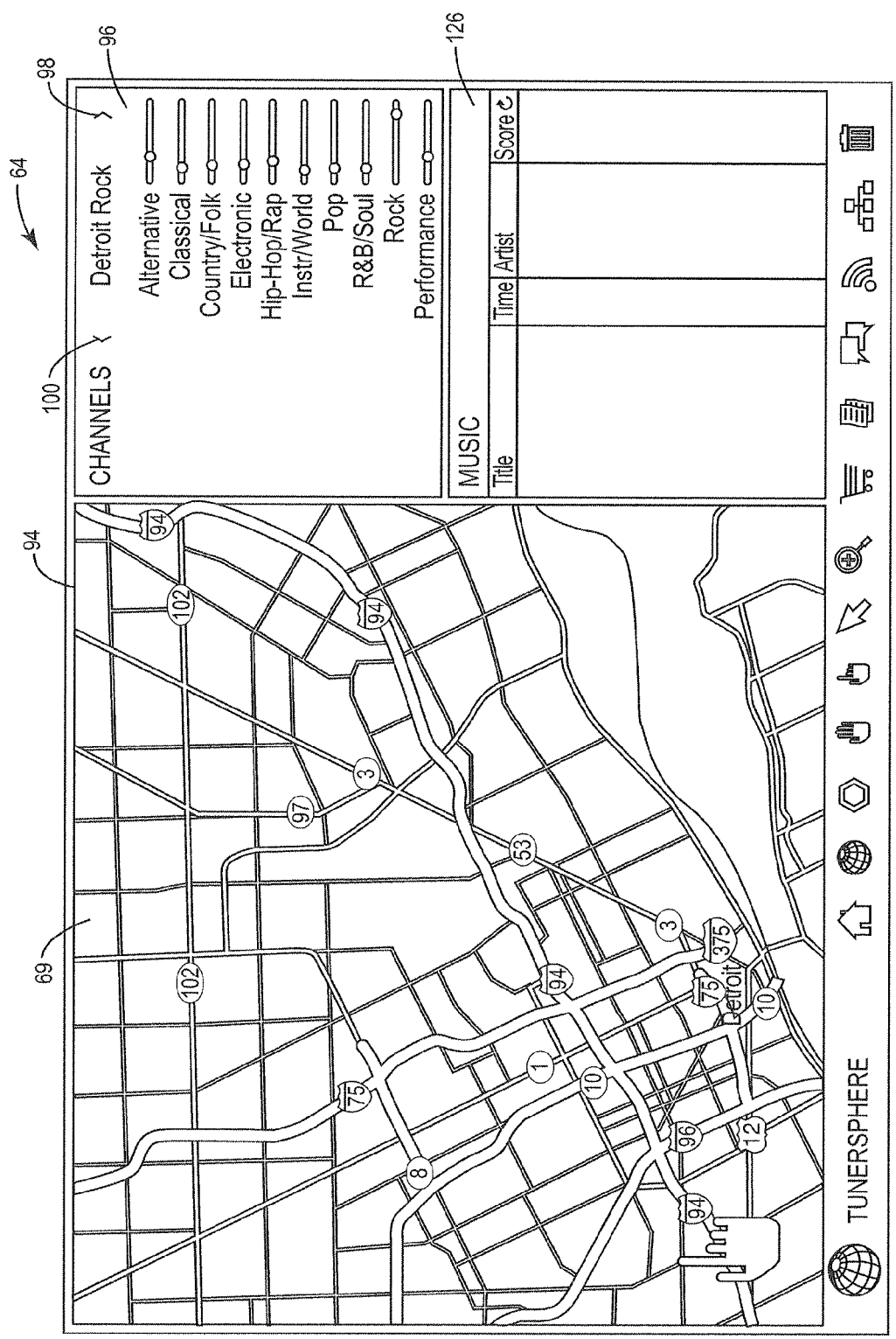
Figure 6D:
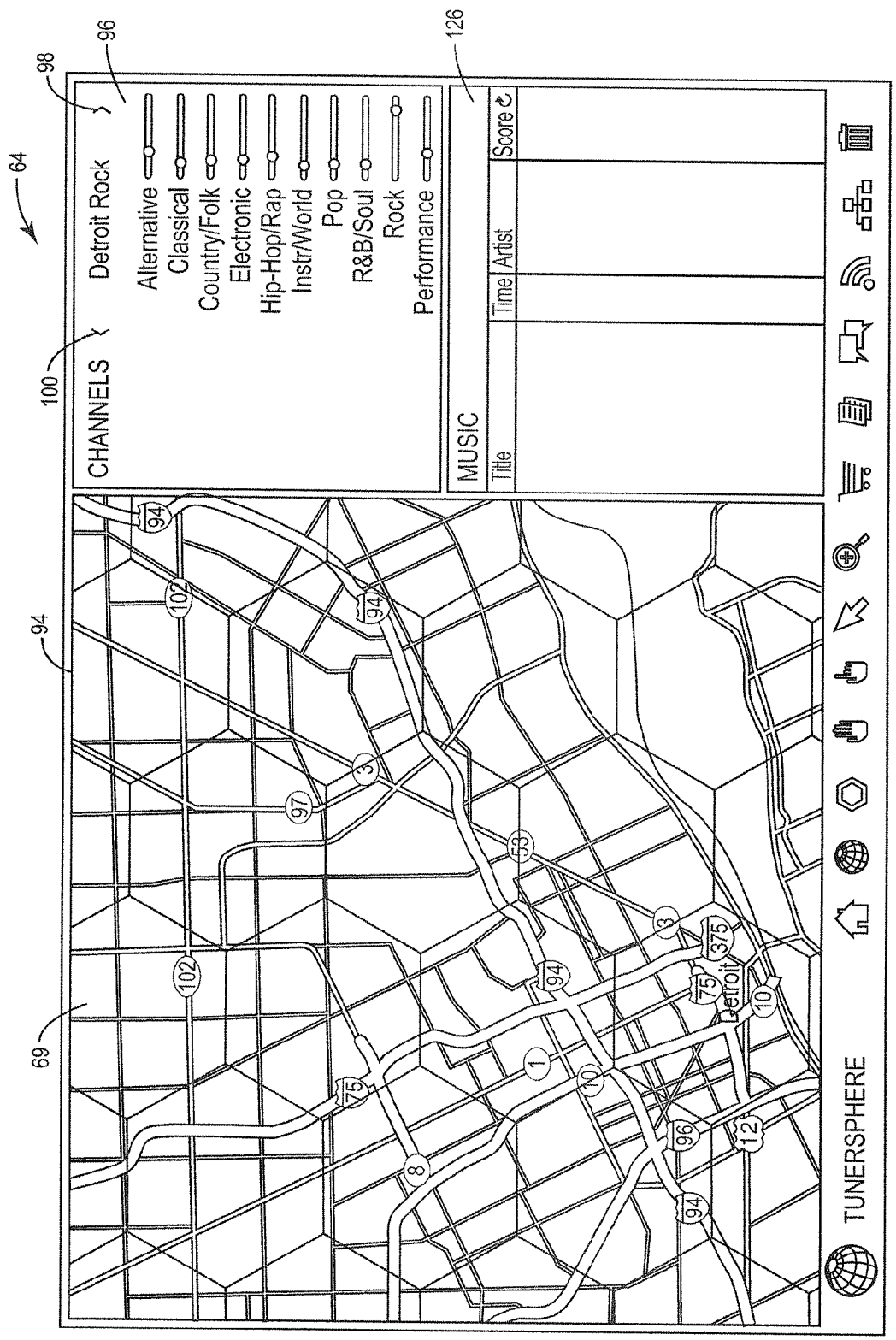
Figure 6E:
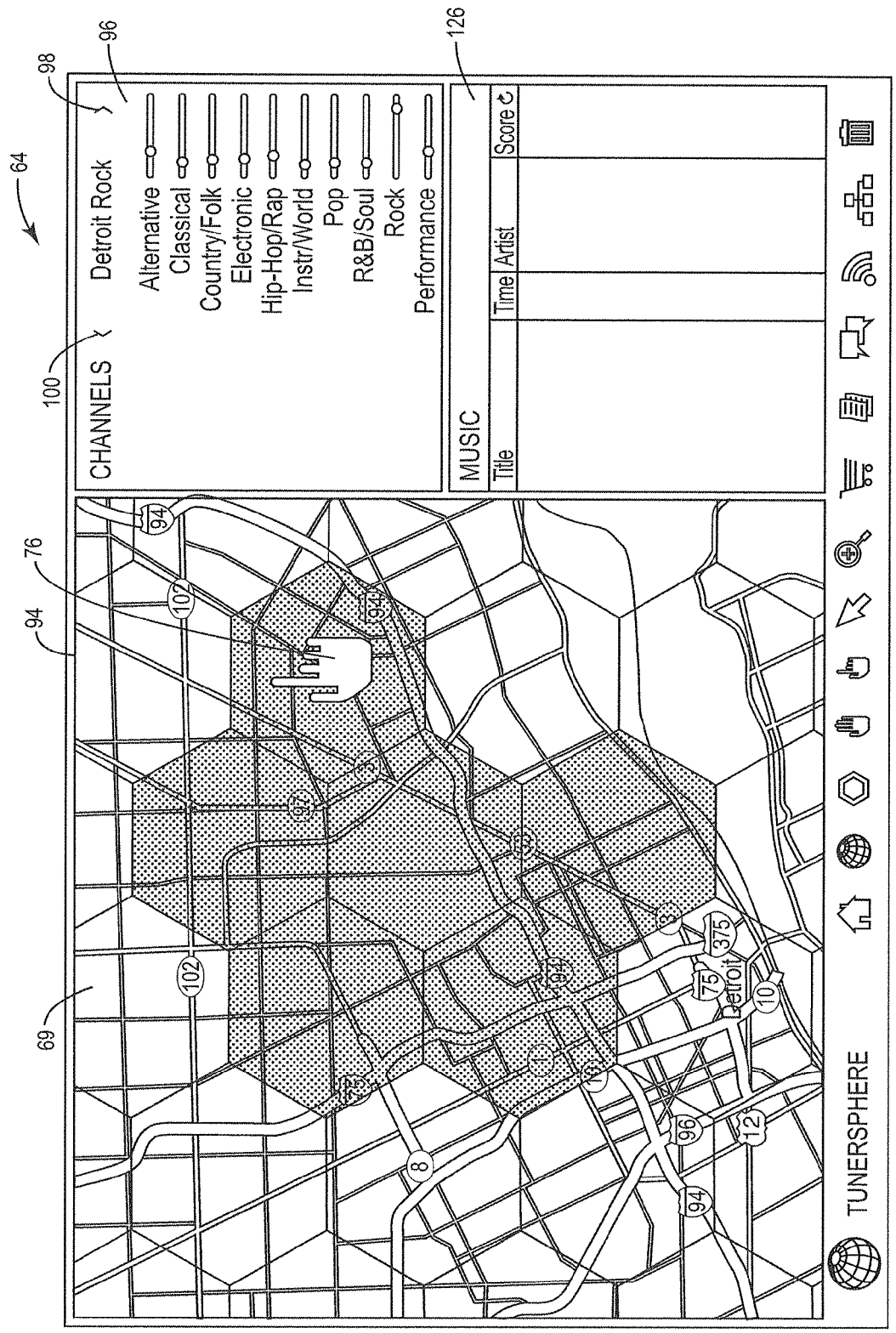
Figure 6F:
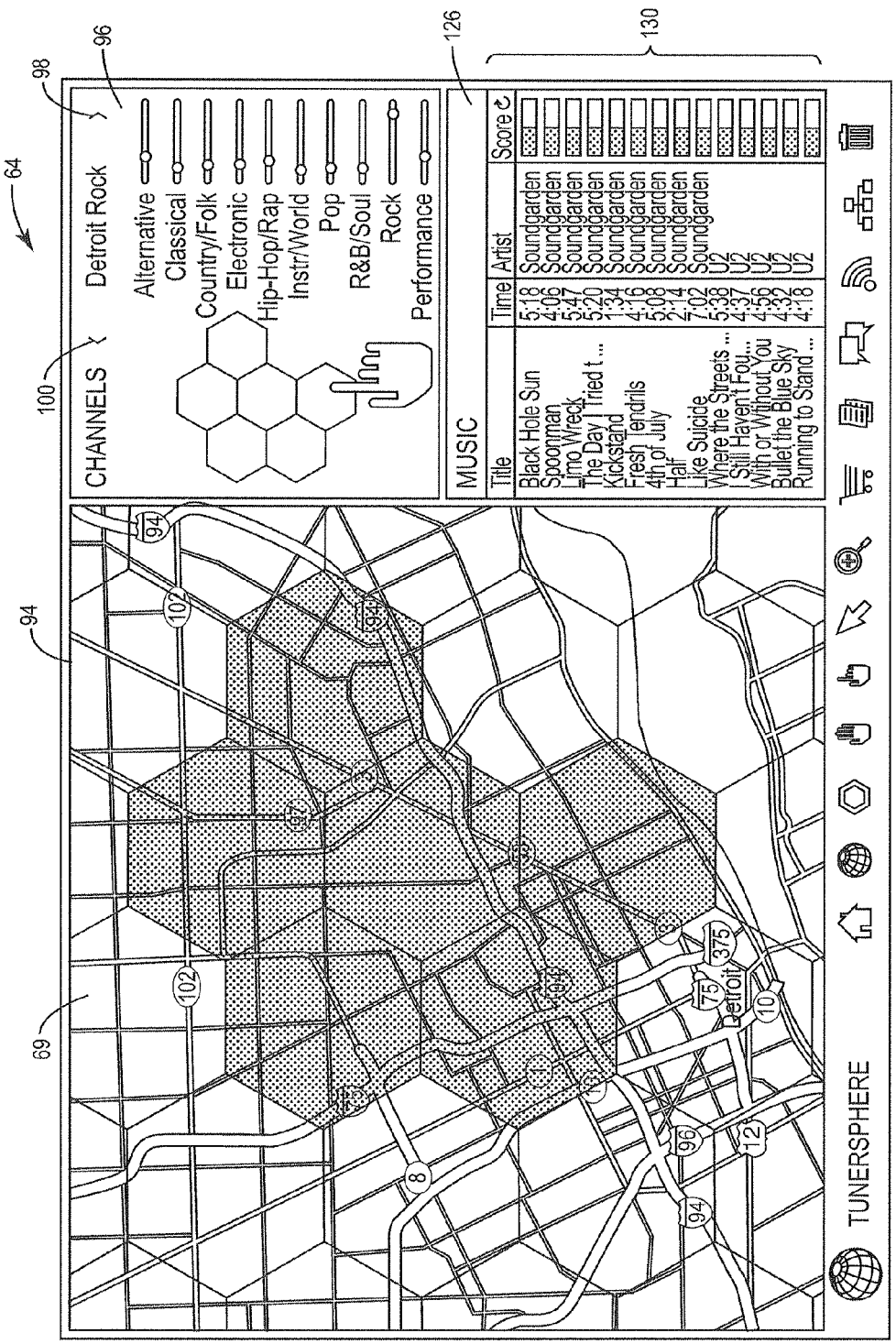

FIG. 6C illustrates the scenario where the user has further zoomed in on a geographic area. Then, in this example, the user activates the hexagon tool 72 such that hexagons are overlaid on the map 69 as shown in FIG. 6D. The user may then activate the hand pointer tool 76 and select one or more of the hexagons overlaid on the map 69 in order to select a desired geographic area of interest as shown in FIG. 6E. Once the geographic area of interest has been selected, the user may drag and drop the selected geographic area into the second section 96 of the GUI 64 as shown in FIG. 6F, thereby associating the selected geographic area with the "Detroit Rock" media channel. In this example, a media request is then automatically sent to the media service 12. In response, the request processor 32 identifies one or more media items for the media channel and returns a response. The response may be a streaming media channel including the identified media items, a list of recommended media items, or the like. As such, in this example, a list 130 of the identified media items is presented in the third section 126 of the GUI 64.

Figure 6G:
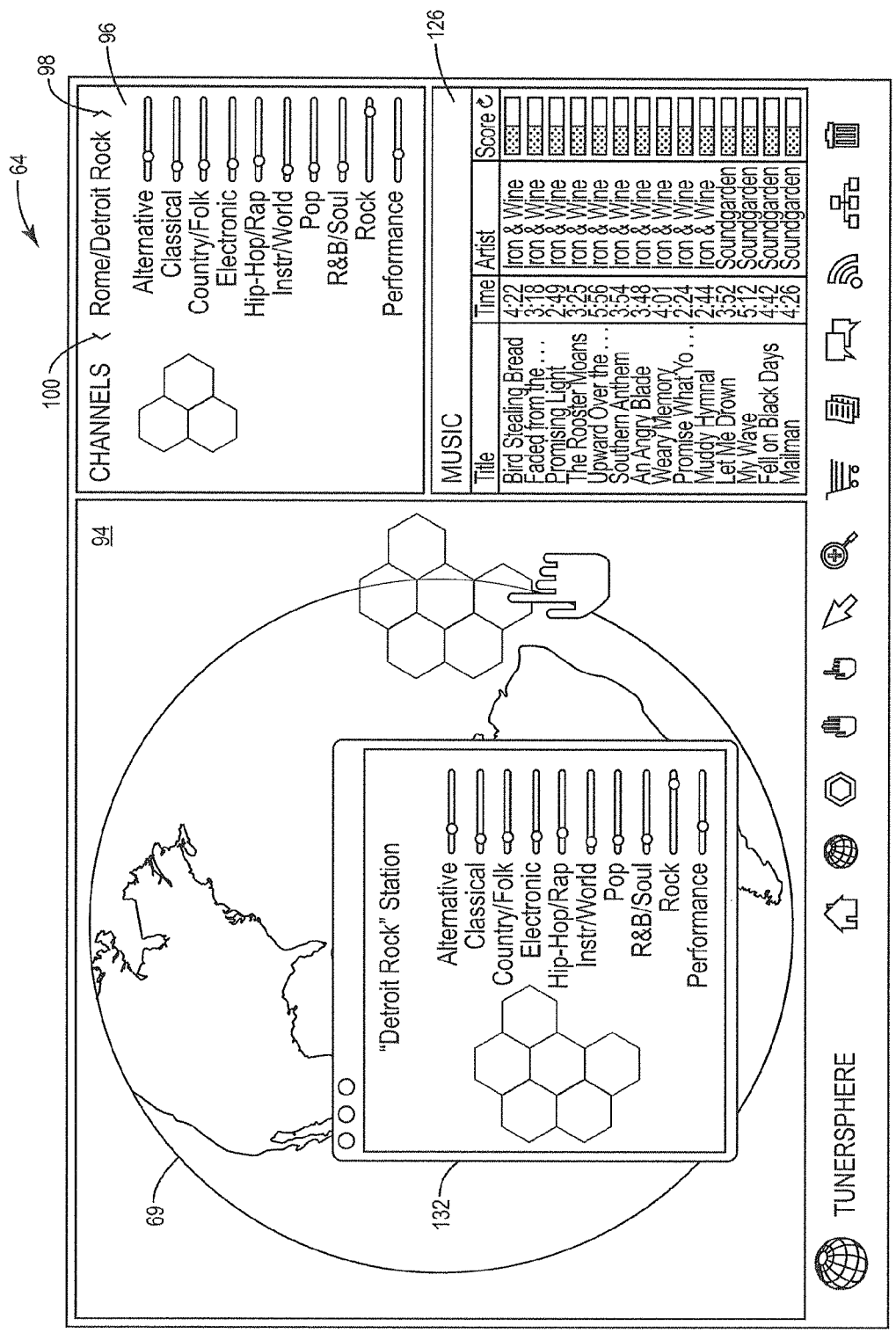
Figure 6H:
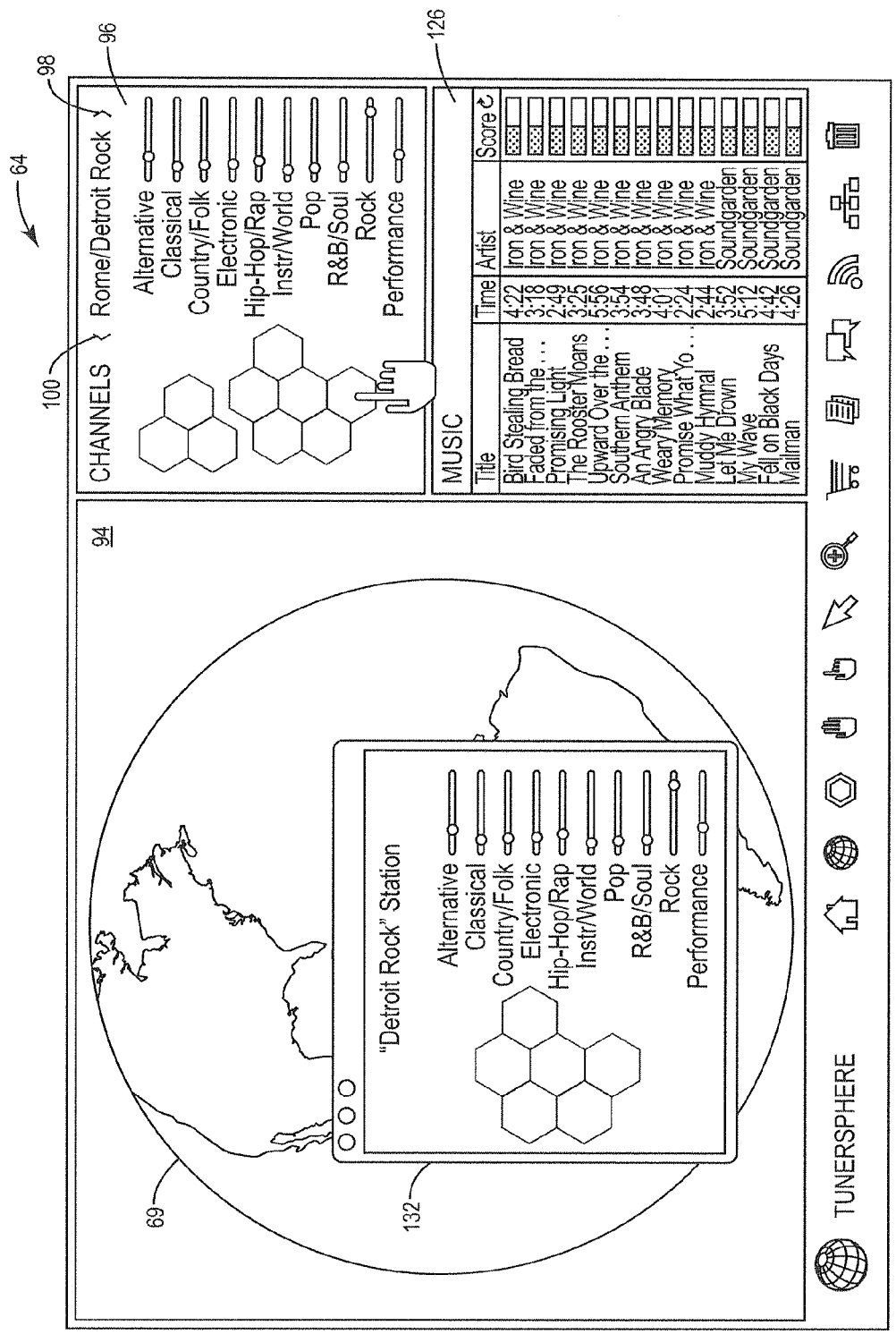
Figure 6I:
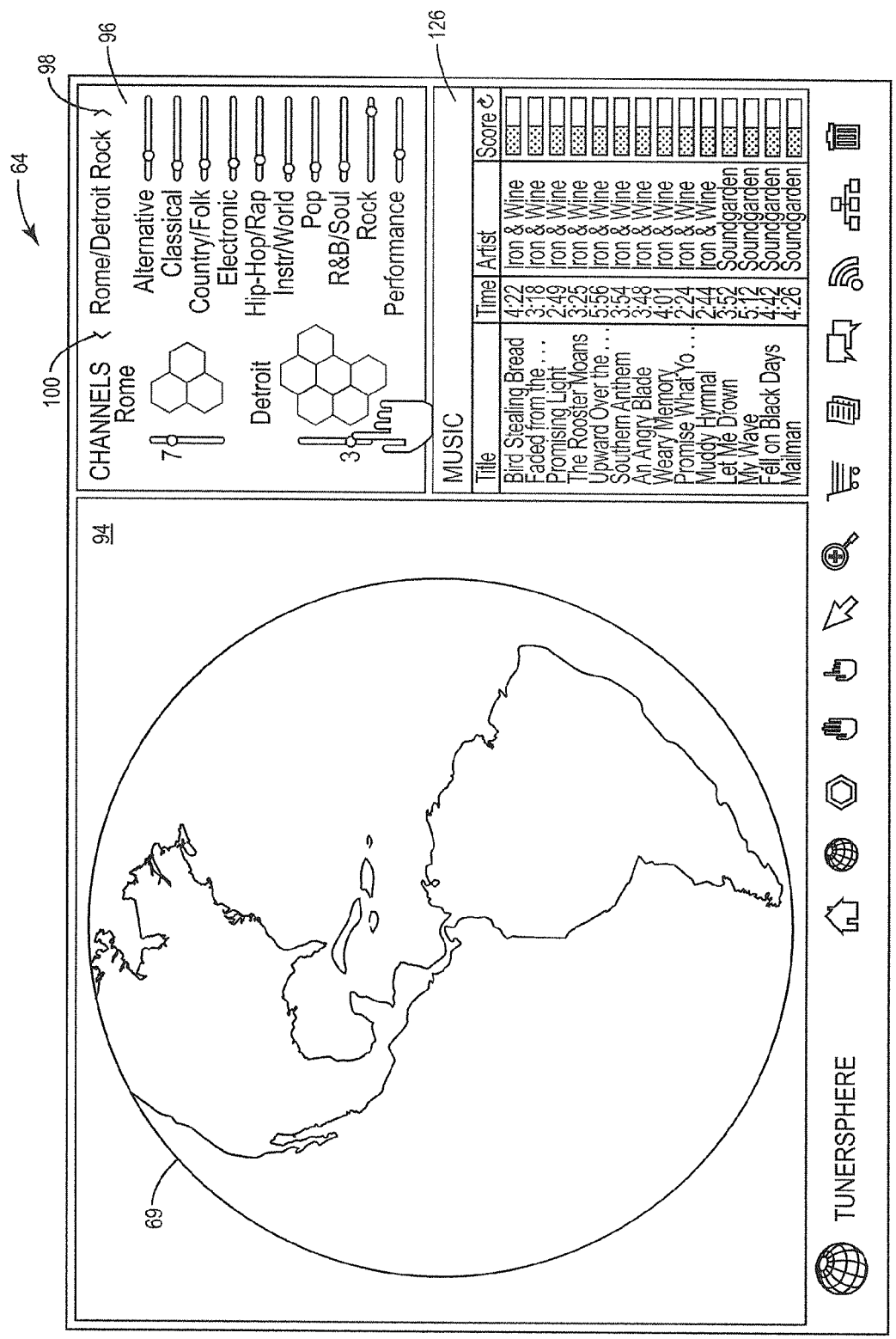

FIGS. 6G and 6H illustrate a scenario where the user defines a new "Rome/Detroit Rock" media channel. The user may initialize the "Rome/Detroit Rock" media channel using the "Rome Alternative" media channel definition of FIG. 6A. The user may then open a window 132 for the "Detroit Rock" media channel and add the geographic area selected for the "Detroit Rock" media channel to the "Rome/Detroit Rock" media channel using a drag and drop process. Optionally, particularly when a media channel has more than one geographic area, the user may be enabled to assign a weight to each of the geographic areas as illustrated in FIG. 6I. As discussed above, the weights assigned to the geographic areas may be used during identification and selection of media items for the media channel.

With regard to weighting and scoring, in one embodiment, weights are assigned to the geographic areas of interest, user-based criteria, and content-based criteria for the media channel. As such, the request processor 32 may identify all media items played within the one or more geographic areas of interest during any defined time window. The identified media items may then be scored as a function of the weights assigned to the geographic areas of interest, the weights assigned to the user-based criteria, the weights assigned to the content-based criteria and, optionally, the user preferences of the user. The media items having scores less than a threshold may then be filtered.

Before proceeding, it should be noted that while the embodiments of FIGS. 1 through 6I described above focus on the use of play histories, any type of media interaction history may additionally or alternatively be used here. As used here, interaction with a media item refers to any type of interaction with a media item such as, for example, listening to a song, watching or viewing a video, receiving a recommendation of the media item, making a recommendation for the media item, downloading the media item, purchasing the media item, rating the media item (e.g., a Facebook® like), identification of the media item (e.g., via fingerprinting or similar audio or video identification technique), or the like. A media interaction history identifies (e.g., lists) media interacted with by a corresponding user.

FIG. 7 illustrates the operation of the media service 12 of FIG. 1 according to another embodiment of the present disclosure. In this embodiment, the media service 12, and more specifically the playback tracking function 28, obtains the media interaction histories of the users 16-1 through 16-N as described above (step 400). The media interaction histories may be obtained in any suitable manner. For example, some media interaction histories may be maintained by and obtained from a social networking service (e.g., Facebook), maintained by the media service 12, or a combination thereof. In one embodiment, the media interaction histories of the users 16-1 through 16-N are play histories of the users 16-1 through 16-N. However, the media interaction histories are not limited thereto. The media interaction histories of the users 16-1 through 16-N are more generally information providing a historical record of media items interacted with by the users 16-1 through 16-N. Again, as used herein, interaction with a media item refers to any type of interaction with the media item such as, for example, listening to the media item in the case where the media item is a song, watching or viewing the media item in the case where the media item is a video, receiving a recommendation for the media item, making a recommendation for the media item, downloading the media item, purchasing the media item, rating the media item (e.g., a Facebook® like), identifying the media item, or the like.

The media service 12 receives a map request from, in this example, the device 14-1 of the user 16-1, which is referred to as the requesting user 16-1 (step 402). The map request may be sent by, for example, the content requestor 40-1 automatically or in response to user input from the user 16-1. The map request is generally a request for representative information for a geographic area of interest. The geographic area of interest may be a specific geographic area of interest for which representative information is desired. Alternatively, the geographic area of interest may be a broad geographic area of interest that is to be sub-divided into sub-areas for purposes of determining representative information. Further, the geographic area of interest may be one of a number of predefined geographic areas of interest selected by the requesting user 16-1 or an arbitrary geographic area of interest selected by the requesting user 16-1. In addition to defining the geographic area of interest, the map request may define one or more time-based criteria (e.g., a time window of interest), one or more user-based criteria, one or more content-based criteria, or any combination thereof.

In response to the map request, the request processor 32 determines representative information for the one or more areas of interest based on at least a subset of the media interaction histories of the users 16-1 through 16-N (step 404). More specifically, in one embodiment, the geographic area of interest is a specific area of interest, and the request processor 32 processes the media interaction histories of the users 16-1 through 16-N, or some select subset thereof, to identify one or more media items that were interacted with by at least some of the users 16-1 through 16-N within the geographic areas of interest and, in some embodiments, satisfy any additional criteria for the map request (e.g., one or more time-based criteria, one or more user-based criteria, and/or one or more content-based criteria). The request processor 32 then determines representative information for the geographic area of interest based on the identified media items.

In one embodiment, the representative information for the geographic area of interest includes information that identifies:

a most consumed (e.g., played) media item in the geographic area of interest,
a most frequently consumed media item in the geographic area of interest,
a media item having a greatest increase in consumption in the geographic area of interest over a defined period of time,
a media item having a greatest decrease in consumption in the geographic area of interest over a defined period of time,
a most consumed song in the geographic area of interest,
a most frequently consumed song in the geographic area of interest,
a song having a greatest increase in consumption in the geographic area of interest over a defined period of time,
a song having a greatest decrease in consumption in the geographic area of interest over a defined period of time,
a most consumed music album in the geographic area of interest,
a most frequently consumed music album in the geographic area of interest,
a music album having a greatest increase in consumption in the geographic area of interest over a defined period of time,
a music album having a greatest decrease in consumption in the geographic area of interest over a defined period of time,
a most consumed media genre (e.g., music genre) in the geographic area of interest,
a most frequently consumed media genre in the geographic area of interest,
a media genre having a greatest increase in consumption in the geographic area of interest over a defined period of time,
a media genre having a greatest decrease in consumption in the geographic area of interest over a defined period of time,
a most consumed music artist in the geographic area of interest,
a most frequently consumed music artist in the geographic area of interest,
a music artist having a greatest increase in consumption in the geographic area of interest over a defined period of time, or
a music artist having a greatest decrease in consumption in the geographic area of interest over a defined period of time.

As used herein, a media item is consumed by a user when the user plays, listens to, or views the media item. Similarly, a music album is consumed when a user plays or listens to one or more, or in some embodiments all, of the songs forming the music album. A media genre (e.g., music genre) is consumed when a user consumes a media item in the media genre. Similarly, a music artist is consumed when a user consumed a song of the music artist.

The media item having the greatest increase in consumption in the geographic area of interest over the defined period of time may be determined by, for example, determining the number of times that a media item was consumed by the users 16-1 through 16-N within the geographic area of interest during a first time interval at the start of the defined time period and the number of times that the media item was consumed by the users 16-1 through 16-N within the geographic area of interest during a second time interval at the end of the defined time period. A difference in these two numbers (e.g., a percentage increase from the number for the first time interval to the number for the second time interval) is the increase in consumption for the media item. This process is repeated for other media items as well. Then, the media item having the greatest increase in consumption is identified. The media item having the greatest decrease in consumption in the geographic area of interest may be determined in the same manner. Likewise, the song, music album, media genre, and music artist having the greatest increase/decrease in consumption for the geographic area of interest may be determined using the same technique.

In addition or alternatively, the representative information for the geographic area of interest includes information that identifies:

a most followed media recommender in the geographic area of interest,
a most frequently followed media recommender in the geographic area of interest,
a media recommender having a greatest increase in recommendation consumption (e.g., recommendation receipt or purchases resulting from recommendation) in the geographic area of interest over a defined period of time, or
a media recommender having a greatest decrease in consumption in the geographic area of interest over a defined period of time.

A "follower" may be, for example, a Twitter® follower or the like. A media recommender may be a person, organization, service, or the like that makes media recommendations (e.g., song recommendations). More specifically, the media interaction histories of the users 16-1 through 16-N may identify media recommendations received by the user 16-1 through 16-N and media recommenders from which the media recommendations were received. The media recommenders may be other ones of the users 16-1 through 16-N, users other than the users 16-1 through 16-N, an automated service, an organization (e.g., a business), or the like. In one embodiment, the users 16-1 through 16-N receive the media recommendations as a result of being "followers" of the corresponding media recommenders or by having otherwise subscribed to media item recommendations from those media recommenders.

The media recommender having the greatest increase in recommendation consumption in the geographic area of interest over the defined period of time may be determined by, for example, determining the number of times that media recommendations from a recommender were consumed by the users 16-1 through 16-N within the geographic area of interest during a first time interval at the start of the defined time period and the number of times that the media recommendations from the recommender were consumed by the users 16-1 through 16-N within the geographic area of interest during a second time interval at the end of the defined time period. A difference in these two numbers (e.g., a percentage increase from the number for the first time interval to the number for the second time interval) is the increase in recommendation consumption for the recommender. This process is repeated for other recommenders as well. Then, the recommender having the greatest increase in recommendation consumption is identified. The media recommender having the greatest decrease in recommendation consumption in the geographic area of interest may be determined in the same manner.

In addition or alternatively, the representative information for the geographic area of interest includes information that identifies:

- a most liked (e.g., liked via Facebook® "like" feature or similar feature of a similar social media application or service) media item in the geographic area of interest,
- a most frequently liked media item in the geographic area of interest,
- a media item having a greatest increase in likes in the geographic area of interest over a defined period of time,
- a media item having a greatest decrease in likes in the geographic area of interest over a defined period of time,
- a most liked song in the geographic area of interest,
- a most frequently liked song in the geographic area of interest,
- a song having a greatest increase in likes in the geographic area of interest over a defined period of time,
- a song having a greatest decrease in likes in the geographic area of interest over a defined period of time,
- a most liked music album in the geographic area of interest,
- a most frequently liked music album in the geographic area of interest,
- a music album having a greatest increase in likes in the geographic area of interest over a defined period of time,
- a music album having a greatest decrease in likes in the geographic area of interest over a defined period of time,
- a most liked media genre (e.g., music genre) in the geographic area of interest,
- a most frequently liked media genre in the geographic area of interest,
- a media genre having a greatest increase in likes in the geographic area of interest over a defined period of time,
- a media genre having a greatest decrease in likes in the geographic area of interest over a defined period of time,
- a most liked music artist in the geographic area of interest,
- a most frequently liked music artist in the geographic area of interest,
- a music artist having a greatest increase in likes in the geographic area of interest over a defined period of time, or
- a music artist having a greatest decrease in likes in the geographic area of interest over a defined period of time.

The media item having the greatest increase in likes in the geographic area of interest over the defined period of time may be determined by, for example, determining the number of times that a media item was liked by the users 16-1 through 16-N within the geographic area of interest during a first time interval at the start of the defined time period and the number of times that the media item was liked by the users 16-1 through 16-N within the geographic area of interest during a second time interval at the end of the defined time period. A difference in these two numbers (e.g., a percentage increase from the number for the first time interval to the number for the second time interval) is the increase in likes for the media item. This process is repeated for other media items as well. Then, the media item having the greatest increase in likes is identified. The media item having the greatest decrease in likes in the geographic area of interest may be determined in the same manner. Likewise, the song, music album, media genre, and music artist having the greatest increase/decrease in likes for the geographic area of interest may be determined using the same technique.

In yet another embodiment, the representative information for the geographic area of interest includes information that identifies:

- a most downloaded media item (e.g., song) in the geographic area of interest,
- a most frequently downloaded media item in the geographic area of interest,
- a media item having a greatest increase in downloads in the geographic area of interest over a defined period of time,
- a media item having a greatest decrease in downloads in the geographic area of interest over a defined period of time,
- a most downloaded music album in the geographic area of interest,
- a most frequently downloaded music album in the geographic area of interest,
- a music album having a greatest increase in downloads in the geographic area of interest over a defined period of time,
- a music album having a greatest decrease in downloads in the geographic area of interest over a defined period of time,
- a most downloaded media genre (e.g., music genre) in the geographic area of interest,
- a most frequently downloaded media genre in the geographic area of interest,
- a media genre having a greatest increase in downloads in the geographic area of interest over a defined period of time,
- a media genre having a greatest decrease in downloads in the geographic area of interest over a defined period of time,
- a most purchased media item (e.g., song) in the geographic area of interest,
- a most frequently purchased media item in the geographic area of interest,
- a media item having a greatest increase in purchases in the geographic area of interest over a defined period of time,
- a media item having a greatest decrease in purchases in the geographic area of interest over a defined period of time,
- a most purchased music album in the geographic area of interest,
- a most frequently purchased music album in the geographic area of interest,
- a music album having a greatest increase in purchases in the geographic area of interest over a defined period of time,
- a music album having a greatest decrease in purchases in the geographic area of interest over a defined period of time,
- a most purchased media genre (e.g., music genre) in the geographic area of interest,
- a most frequently purchased media genre in the geographic area of interest,
- a media genre having a greatest increase in purchases in the geographic area of interest over a defined period of time, or a media genre having a greatest decrease in purchases in the geographic area of interest over a defined period of time.

The media item having the greatest increase in downloads (or purchases) in the geographic area of interest over the defined period of time may be determined by, for example, determining the number of times that a media item was downloaded by the users 16-1 through 16-N within the geographic area of interest during a first time interval at the start of the defined time period and the number of times that the media item was downloaded by the users 16-1 through 16-N within the geographic area of interest during a second time interval at the end of the defined time period. A difference in these two numbers (e.g., a percentage increase from the number for the first time interval to the number for the second time interval) is the increase in downloads for the media item. This process is repeated for other media items as well. Then, the media item having the greatest increase in downloads is identified. The media item having the greatest decrease in downloads in the geographic area of interest may be determined in the same manner. Likewise, the song, music album, and media genre having the greatest increase/decrease in downloads (or purchases) for the geographic area of interest may be determined using the same technique.

In yet another embodiment, the representative information for the geographic area of interest includes information that identifies:
- a most identified media item (e.g., song) in the geographic area of interest,
- a most frequently identified media item in the geographic area of interest,
- a media item having a greatest increase in identifications in the geographic area of interest over a defined period of time, or
- a media item having a greatest decrease in identifications in the geographic area of interest over a defined period of time.

Note that media items may be identified using any suitable media item identification technique such as, for example, fingerprinting. For some exemplary and non-limiting examples of media item identification techniques, the interested reader is directed to U.S. Pat. No. 7,765,192, which is hereby incorporated herein by reference for its teachings related to media item identification techniques. In general, as used herein, an identification of a media item is any event wherein a media item is identified for a user. As an example, a song heard on the radio may be identified as Song X by Artist Y by an application (e.g., Shazam) running on the user's smart phone by processing an audio sample(s) obtained via the smart phone's microphone.

The media item having the greatest increase in identification in the geographic area of interest over the defined period of time may be determined by, for example, determining the number of times that a media item was identified by the users 16-1 through 16-N within the geographic area of interest during a first time interval at the start of the defined time period and the number of times that the media item was identified by the users 16-1 through 16-N within the geographic area of interest during a second time interval at the end of the defined time period. A difference in these two numbers (e.g., a percentage increase from the number for the first time interval to the number for the second time interval) is the increase in identifications for the media item. This process is repeated for other media items as well. Then, the media item having the greatest increase in identifications is identified. The media item having the greatest decrease in identifications in the geographic area of interest may be determined in the same manner.

In another embodiment, the geographic area of interest is a broad geographic area of interest, and the request processor 32 divides the geographic area of interest into a number of sub-areas. The sub-areas may be, for example, of a predefined shape and size (e.g., hexagons of predefined shape or size). As another example, the sub-areas may be a predefined shape but have a size that is relative to a size of the geographic area of interest (e.g., larger sub-areas for larger geographic area of interest). Notably, the sub-areas may be of different shapes and sizes (e.g., the sub-areas may correspond to country, state, city, or other governmental entity borders). For each sub-area, the request processor 32 processes the media interaction histories of the users 16-1 through 16-N, or some select subset thereof, to identify one or more media items that were interacted with in the sub-area and, in some embodiments, satisfy any additional criteria for the map request (e.g., one or more time-based criteria, one or more user-based criteria, and/or one or more content-based criteria). The request processor 32 then determines representative information for the sub-area based on the identified media items.

In one embodiment, for each sub-area of the geographic area of interest, the representative information for the sub-area includes information that identifies:
- a most consumed (e.g., played) media item in the sub-area,
- a most frequently consumed media item in the sub-area,
- a media item having a greatest increase in consumption in the sub-area over a defined period of time,
- a media item having a greatest decrease in consumption in the sub-area over a defined period of time,
- a most consumed song in the sub-area,
- a most frequently consumed song in the sub-area,
- a song having a greatest increase in consumption in the sub-area over a defined period of time,
- a song having a greatest decrease in consumption in the sub-area over a defined period of time,
- a most consumed music album in the sub-area,
- a most frequently consumed music album in the sub-area,
- a music album having a greatest increase in consumption in the sub-area over a defined period of time,
- a music album having a greatest decrease in consumption in the sub-area over a defined period of time,
- a most consumed media genre (e.g., music genre) in the sub-area,
- a most frequently consumed media genre in the sub-area,
- a media genre having a greatest increase in consumption in the sub-area over a defined period of time,
- a media genre having a greatest decrease in consumption in the sub-area over a defined period of time,
- a most consumed music artist in the sub-area,
- a most frequently consumed music artist in the sub-area,
- a music artist having a greatest increase in consumption in the sub-area over a defined period of time, or
- a music artist having a greatest decrease in consumption in the sub-area over a defined period of time.

In addition or alternatively, the geographic area of interest is divided into a number of sub-areas, and the representative information includes, for each sub-area, information that identifies:
- a most followed media recommender in the sub-area,
- a most frequently followed media recommender in the sub-area,
- a media recommender having a greatest increase in recommendation consumption (e.g., recommendation receipt or purchases resulting from recommendation) in the sub-area over a defined period of time, or a media recommender having a greatest decrease in consumption in the sub-area over a defined period of time.

In addition or alternatively, the geographic area of interest is divided into a number of sub-areas, and the representative information includes, for each sub-area, information that identifies:

a most liked media item in the sub-area, a most frequently liked media item in the sub-area, a media item having a greatest increase in likes in the sub-area over a defined period of time, a media item having a greatest decrease in likes in the sub-area over a defined period of time, a most liked song in the sub-area, a most frequently liked song in the sub-area, a song having a greatest increase in likes in the sub-area over a defined period of time, a song having a greatest decrease in likes in the sub-area over a defined period of time, a most liked music album in the sub-area, a most frequently liked music album in the sub-area, a music album having a greatest increase in likes in the sub-area over a defined period of time, a music album having a greatest decrease in likes in the sub-area over a defined period of time, a most liked media genre (e.g., music genre) in the sub-area, a most frequently liked media genre in the geographic area of interest, a media genre having a greatest increase in likes in the sub-area over a defined period of time, a media genre having a greatest decrease in likes in the sub-area over a defined period of time, a most liked music artist in the sub-area, a most frequently liked music artist in the sub-area, a music artist having a greatest increase in likes in the sub-area over a defined period of time, or a music artist having a greatest decrease in likes in the sub-area over a defined period of time.

In addition or alternatively, the geographic area of interest is divided into a number of sub-areas, and the representative information includes, for each sub-area, information that identifies:

a most downloaded media item (e.g., song) in the sub-area, a most frequently downloaded media item in the sub-area, a media item having a greatest increase in downloads in the sub-area over a defined period of time, a media item having a greatest decrease in downloads in the sub-area over a defined period of time, a most downloaded music album in the sub-area, a most frequently downloaded music album in the sub-area, a music album having a greatest increase in downloads in the sub-area over a defined period of time, a music album having a greatest decrease in downloads in the sub-area over a defined period of time, a most downloaded media genre (e.g., music genre) in the sub-area, a most frequently downloaded media genre in the sub-area, a media genre having a greatest increase in downloads in the sub-area over a defined period of time, a media genre having a greatest decrease in downloads in the sub-area over a defined period of time, a most purchased media item (e.g., song) in the sub-area, a most frequently purchased media item in the sub-area, a media item having a greatest increase in purchases in the sub-area over a defined period of time, a media item having a greatest decrease in purchases in the sub-area over a defined period of time, a most purchased music album in the sub-area, a most frequently purchased music album in the sub-area, a music album having a greatest increase in purchases in the sub-area over a defined period of time, a music album having a greatest decrease in purchases in the sub-area over a defined period of time, a most purchased media genre (e.g., music genre) in the sub-area, a most frequently purchased media genre in the sub-area, a media genre having a greatest increase in purchases in the sub-area over a defined period of time, or a media genre having a greatest decrease in purchases in the sub-area over a defined period of time.

In addition or alternatively, the geographic area of interest is divided into a number of sub-areas, and the representative information includes, for each sub-area, information that identifies:

a most identified media item (e.g., song) in the sub-area, a most frequently identified media item in the sub-area, a media item having a greatest increase in identifications in the sub-area over a defined period of time, or a media item having a greatest decrease in identifications in the sub-area over a defined period of time.

Once the representative information is determined, the request processor 32 effects display of the representative information (step 406). In one embodiment, the request processor 32 effects display of the representative information at the device 14-1 of the requesting user 16-1. More specifically, the request processor 32 sends the representative information to the device 14-1 of the requesting user 16-1. The device 14-1 then displays the representative information to the requesting user 16-1.

In this exemplary embodiment, the media service 12 receives a request to change or modify the geographic area of interest from the content requestor 40-1 of the user 16-1 (step 408). For example, the request may be a zoom request to either zoom in or zoom out on the geographic area of interest. As another example, the request may be a request to change the geographic area of interest to a new geographic area of interest. In response, the content requestor 40-1 changes or modifies the geographic area of interest (step 410), and then the process returns to step 404.

FIG. 8 illustrates an exemplary GUI 134 for displaying representative information to a user such as, for example, the requesting user 16-1 according to one embodiment of the present disclosure. As illustrated, in this example, the GUI 134 includes a map display area 136, and a map request with a geographic area of interest corresponding to a geographic area displayed in the map display area 136 was received by the media service 12. In response, the media service 12 divided the geographic area of interest into a number of sub-areas 138 and determined representative information for each of the sub-areas 138. In this example, the representative information for each of the sub-areas 138 is album art for a most consumed music album in that sub-area. However, the representative information is not limited thereto.

The GUI 134 may enable the user to select one of the sub-areas 138 to zoom in on that sub-area 138. In response to the selection of one of the sub-areas 138, a request to zoom in on that sub-area is sent to the media service 12. The media service 12 then determines representative information for each of a number of sub-areas of the selected sub-area. The GUI 134 is then updated to zoom in on the selected sub-area 138 to show its sub-areas and their representative information. The GUI 134 may also enable the user to rotate or otherwise manipulate the map display area 136. For instance, in this example, the map display area 136 includes a globe shaped object representing the spherical shape of the earth. The GUI 134 may enable the user to rotate the globe shaped object to view representative information for additional areas, which may be processed as sub-areas within the geographic area of interest or sub-areas within a new geographic area of interest. Still further, the GUI 134 may also enable the user to select the representative information for desired sub-area 138 to initiate playback, downloading, purchasing, or the like of one or more corresponding media items.

FIG. 9 illustrates an exemplary GUI 140 for displaying representative information to a user such as, for example, the requesting user 16-1 according to one embodiment of the present disclosure. As illustrated, in this example, the GUI 140 includes a map display area 142, and a map request with a geographic area of interest corresponding to a geographic area displayed in the map display area 142 was received by the media service 12. In this example, the geographic area of interest is divided into a number of states, which serve as sub-areas of the geographic area of interest. The media service 12 determined representative information for each of the states. In this example, the representative information for each of the states is provided as icons 144 representing most consumed music recommenders in the corresponding states/sub-areas. However, the representative information is not limited thereto.

The GUI 140 may enable the user to select one of the sub-areas to zoom in on that sub-area. In response to the selection of one of the sub-areas, a request to zoom in on that sub-area is sent to the media service 12. The media service 12 then determines representative information for each of a number of sub-areas of the selected sub-area. The GUI 140 is then updated to zoom in on the selected sub-area to show its sub-areas and their representative information. The GUI 140 may also enable the user to manipulate the map display area 142. Still further, the GUI 140 may also enable the user to select the representative information for desired state/sub-area to initiate playback, downloading, purchasing, or the like of one or more corresponding media items.

FIG. 10 is a block diagram of the device 14-1 of FIG. 1 according to one embodiment of the present disclosure. This discussion is equally applicable to the other devices 14-2 through 14-N. In general, the device 14-1 includes a control system 146 having associated memory 148. In this example, the media player 36-1 and the content requestor 40-1 are each implemented in software and stored in the memory 148. However, the present disclosure is not limited thereto. Each of the media player 36-1 and the content requestor 40-1 may be implemented in software, hardware, or a combination thereof. In this example, the location determination function 38-1 is implemented in hardware and connected to the control system 146. For example, the location determination function 38-1 may be a GPS receiver. However, the present disclosure is not limited thereto. The location determination function 38-1 may be implemented in software, hardware, or a combination thereof. The device 14-1 may also include one or more digital storage devices 150 such as, for example, one or more hard disk drives, one or more internal or removable memory units, or the like. The media collection 42-1 (FIG. 1) may be stored in the one or more digital storage devices 150, the memory 148, or a combination thereof. The device 14-1 also includes a communication interface 152 enabling the device 14-1 to connect to the network 18 (FIG. 1). Lastly, the device 14-1 also includes a user interface 154 including components such as, for example, a display, one or more user input devices, a speaker, or the like.

FIG. 11 is a block diagram of the central server 20 of FIG. 1 according to one embodiment of the present disclosure. In general, the central server 20 includes a control system 156 having associated memory 158. In this example, the tunersphere function 26 is implemented in software and stored in the memory 158. However, the present disclosure is not limited thereto. The tunersphere function 26 may be implemented in software, hardware, or a combination thereof. The central server 20 may also include one or more digital storage devices 160 such as, for example, one or more hard disk drives. In one embodiment, the user account repository 22 and/or the content repository 24 (FIG. 1) are stored in the one or more digital storage devices 160. The central server 20 also includes a communication interface 162 communicatively coupling the central server 20 to the network 18 (FIG. 1). Lastly, the central server 20 may include a user interface 164, which may include components such as, for example, a display, one or more user input devices, or the like.

Those skilled in the art will recognize improvements and modifications to the preferred embodiments of the present disclosure. All such improvements and modifications are considered within the scope of the concepts disclosed herein and the claims that follow.

What is claimed is:

1. A method comprising:
   obtaining play histories of a plurality of users, each play history identifying media items played by a corresponding one of the plurality of users and locations at which at least a subset of the media items were played by the corresponding one of the plurality of users;
   enabling a user to select one or more geographic areas;
   processing the play histories of at least a subset of the plurality of users to identify one or more media items played within the one or more geographic areas; and
   providing data that reflects the one or more media items played within the one or more geographic areas.

2. A method comprising:
   obtaining media interaction histories of a plurality of users, each media interaction history identifying media items interacted with by a corresponding one of the plurality of users and locations at which at least a subset of the media items were interacted with by the corresponding one of the plurality of users;
   enabling a user to select one or more geographic areas;
   obtaining information derived from processing the media interaction histories of at least a subset of the plurality of users to identify one or more media items consumed within the one or more geographic areas; and
   providing data that reflects the one or more media items interacted with in the one or more geographic areas.

3. A method comprising:
   obtaining media interaction histories of a plurality of users, each media interaction history identifying media items interacted with by a corresponding one of the plurality of users and locations at which at least a subset of the media items were interacted with by the corresponding one of the plurality of users;
   obtaining a geographic area of interest;
   determining representative information for the geographic area of interest by processing the media interaction histories of at least a subset of the plurality of users; and
   effecting display of the representative information.

4. The method of claim 3 wherein determining the representative information comprises:

processing the media interaction histories of at least a subset of the plurality of users to identify media items interacted with in the geographic area of interest; and determining the representative information for the geographic area of interest based on the media items interacted with in the geographic area of interest.

5. The method of claim 4 wherein effecting display of the representative information comprises effecting display of the representative information within an area on a map that corresponds to the geographic area of interest.

6. The method of claim 5 wherein the representative information comprises information that identifies one of a group consisting of
 a most consumed media item in the geographic area of interest,
 a most frequently consumed media item in the geographic area of interest,
 a media item having a greatest increase in consumption in the geographic area of interest over a defined period of time,
 a media item having a greatest decrease in consumption in the geographic area of interest over a defined period of time,
 a most consumed song in the geographic area of interest,
 a most frequently consumed song in the geographic area of interest,
 a song having a greatest increase in consumption in the geographic area of interest over a defined period of time,
 a song having a greatest decrease in consumption in the geographic area of interest over a defined period of time,
 a most consumed music album in the geographic area of interest,
 a most frequently consumed music album in the geographic area of interest,
 a music album having a greatest increase in consumption in the geographic area of interest over a defined period of time,
 a music album having a greatest decrease in consumption in the geographic area of interest over a defined period of time,
 a most consumed media genre in the geographic area of interest,
 a most frequently consumed media genre in the geographic area of interest,
 a media genre having a greatest increase in consumption in the geographic area of interest over a defined period of time,
 a media genre having a greatest decrease in consumption in the geographic area of interest over a defined period of time,
 a most consumed music artist in the geographic area of interest,
 a most frequently consumed music artist in the geographic area of interest,
 a music artist having a greatest increase in consumption in the geographic area of interest over a defined period of time, and
 a music artist having a greatest decrease in consumption in the geographic area of interest over a defined period of time.

7. The method of claim 5 wherein the representative information comprises information that identifies one of a group consisting of:
 a most followed media recommender in the geographic area of interest,
 a most frequently followed media recommender in the geographic area of interest,
 a media recommender having a greatest increase in recommendation consumption in the geographic area of interest over a defined period of time, and
 a media recommender having a greatest decrease in consumption in the geographic area of interest over a defined period of time.

8. The method of claim 5 wherein the representative information comprises information that identifies one of a group consisting of:
 a most liked media item in the geographic area of interest,
 a most frequently liked media item in the geographic area of interest,
 a media item having a greatest increase in likes in the geographic area of interest over a defined period of time,
 a media item having a greatest decrease in likes in the geographic area of interest over a defined period of time,
 a most liked song in the geographic area of interest,
 a most frequently liked song in the geographic area of interest,
 a song having a greatest increase in likes in the geographic area of interest over a defined period of time,
 a song having a greatest decrease in likes in the geographic area of interest over a defined period of time,
 a most liked music album in the geographic area of interest,
 a most frequently liked music album in the geographic area of interest,
 a music album having a greatest increase in likes in the geographic area of interest over a defined period of time,
 a music album having a greatest decrease in likes in the geographic area of interest over a defined period of time,
 a most liked media genre (e.g., music genre) in the geographic area of interest,
 a most frequently liked media genre in the geographic area of interest,
 a media genre having a greatest increase in likes in the geographic area of interest over a defined period of time,
 a media genre having a greatest decrease in likes in the geographic area of interest over a defined period of time,
 a most liked music artist in the geographic area of interest,
 a most frequently liked music artist in the geographic area of interest,
 a music artist having a greatest increase in likes in the geographic area of interest over a defined period of time, and
 a music artist having a greatest decrease in likes in the geographic area of interest over a defined period of time.

9. The method of claim 5 wherein the representative information comprises information that identifies one of a group consisting of:
 a most downloaded media item in the geographic area of interest,
 a most frequently downloaded media item in the geographic area of interest,
 a media item having a greatest increase in downloads in the geographic area of interest over a defined period of time,
 a media item having a greatest decrease in downloads in the geographic area of interest over a defined period of time,
 a most downloaded music album in the geographic area of interest,
 a most frequently downloaded music album in the geographic area of interest,
 a music album having a greatest increase in downloads in the geographic area of interest over a defined period of time,
 a music album having a greatest decrease in downloads in the geographic area of interest over a defined period of time, a most downloaded media genre in the geographic area of interest,
a most frequently downloaded media genre in the geographic area of interest,
a media genre having a greatest increase in downloads in the geographic area of interest over a defined period of time,
a media genre having a greatest decrease in downloads in the geographic area of interest over a defined period of time,
a most purchased media item in the geographic area of interest,
a most frequently purchased media item in the geographic area of interest,
a media item having a greatest increase in purchases in the geographic area of interest over a defined period of time,
a media item having a greatest decrease in purchases in the geographic area of interest over a defined period of time,
a most purchased music album in the geographic area of interest,
a most frequently purchased music album in the geographic area of interest,
a music album having a greatest increase in purchases in the geographic area of interest over a defined period of time,
a music album having a greatest decrease in purchases in the geographic area of interest over a defined period of time,
a most purchased media genre in the geographic area of interest,
a most frequently purchased media genre in the geographic area of interest,
a media genre having a greatest increase in purchases in the geographic area of interest over a defined period of time, and
a media genre having a greatest decrease in purchases in the geographic area of interest over a defined period of time.

10. The method of claim 3 wherein determining the representative information comprises:
processing the media interaction histories of at least a subset of the plurality of users to identify media items consumed within the geographic area of interest during a defined time period; and
determining the representative information for the geographic area of interest based on the media items consumed within the geographic area of interest during the defined time period.

11. The method of claim 3 wherein determining the representative information comprises:
processing the media interaction histories of at least a subset of the plurality of users to identify media items that were played within the geographic area of interest and satisfy one or more additional criteria; and
determining the representative information for the geographic area of interest based on the media items that were played within the geographic area of interest and satisfy the one or more additional criteria.

12. The method of claim 11 wherein effecting display of the representative information comprises effecting display of the representative information within an area on a map that corresponds to the geographic area of interest.

13. The method of claim 11 wherein the one or more additional criteria comprise one or more of a group consisting of: one or more user-based criteria, one or more content-based criteria, and one or more time-based criteria.

14. The method of claim 3 wherein determining the representative information comprises, for each of a plurality of sub-areas within the geographic area of interest:
processing the media interaction histories of at least a subset of the plurality of users to identify media items played within the sub-area; and
determining representative information for the sub-area based on the media items played within the sub-area.

15. The method of claim 14 wherein effecting display of the representative information comprises, for each sub-area of the plurality of sub-areas, effecting display of the representative information for the sub-area within an area on a map that corresponds to the sub-area of the geographic area of interest.

16. The method of claim 15 wherein, for each sub-area, the representative information for the sub-area comprises information that identifies one of a group consisting of:
a most consumed media item in the sub-area,
a most frequently consumed media item in the sub-area,
a media item having a greatest increase in consumption in the sub-area over a defined period of time,
a media item having a greatest decrease in consumption in the sub-area over a defined period of time,
a most consumed song in the sub-area,
a most frequently consumed song in the sub-area,
a song having a greatest increase in consumption in the sub-area over a defined period of time,
a song having a greatest decrease in consumption in the sub-area over a defined period of time,
a most consumed music album in the sub-area,
a most frequently consumed music album in the sub-area,
a music album having a greatest increase in consumption in the sub-area over a defined period of time,
a music album having a greatest decrease in consumption in the sub-area over a defined period of time,
a most consumed media genre in the sub-area,
a most frequently consumed media genre in the sub-area,
a media genre having a greatest increase in consumption in the sub-area over a defined period of time,
a media genre having a greatest decrease in consumption in the sub-area over a defined period of time,
a most consumed music artist in the sub-area,
a most frequently consumed music artist in the sub-area,
a music artist having a greatest increase in consumption in the sub-area over a defined period of time, and
a music artist having a greatest decrease in consumption in the sub-area over a defined period of time.

17. The method of claim 15 wherein, for each sub-area, the representative information for the sub-area comprises information that identifies one of a group consisting of:
a most followed media recommender in the sub-area,
a most frequently followed media recommender in the sub-area,
a media recommender having a greatest increase in recommendation consumption in the sub-area over a defined period of time, and
a media recommender having a greatest decrease in consumption in the sub-area over a defined period of time.

18. The method of claim 15 wherein, for each sub-area, the representative information for the sub-area comprises information that identifies one of a group consisting of:
a most liked media item in the sub-area,
a most frequently liked media item in the sub-area,
a media item having a greatest increase in likes in the sub-area over a defined period of time,
a media item having a greatest decrease in likes in the sub-area over a defined period of time, a most liked song in the sub-area,
a most frequently liked song in the sub-area,
a song having a greatest increase in likes in the sub-area over a defined period of time,
a song having a greatest decrease in likes in the sub-area over a defined period of time,
a most liked music album in the sub-area,
a most frequently liked music album in the sub-area,
a music album having a greatest increase in likes in the sub-area over a defined period of time,
a music album having a greatest decrease in likes in the sub-area over a defined period of time,
a most liked media genre in the sub-area,
a most frequently liked media genre in the geographic area of interest,
a media genre having a greatest increase in likes in the sub-area over a defined period of time,
a media genre having a greatest decrease in likes in the sub-area over a defined period of time,
a most liked music artist in the sub-area,
a most frequently liked music artist in the sub-area,
a music artist having a greatest increase in likes in the sub-area over a defined period of time, and
a music artist having a greatest decrease in likes in the sub-area over a defined period of time.

19. The method of claim 15 wherein, for each sub-area, the representative information for the sub-area comprises information that identifies one of a group consisting of:
a most downloaded media item in the sub-area,
a most frequently downloaded media item in the sub-area,
a media item having a greatest increase in downloads in the sub-area over a defined period of time,
a media item having a greatest decrease in downloads in the sub-area over a defined period of time,
a most downloaded music album in the sub-area,
a most frequently downloaded music album in the sub-area,
a music album having a greatest increase in downloads in the sub-area over a defined period of time,
a music album having a greatest decrease in downloads in the sub-area over a defined period of time,
a most downloaded media genre in the sub-area,
a most frequently downloaded media genre in the sub-area,
a media genre having a greatest increase in downloads in the sub-area over a defined period of time,
a media genre having a greatest decrease in downloads in the sub-area over a defined period of time,
a most purchased media item in the sub-area,
a most frequently purchased media item in the sub-area,
a media item having a greatest increase in purchases in the sub-area over a defined period of time,
a media item having a greatest decrease in purchases in the sub-area over a defined period of time,
a most purchased music album in the sub-area,
a most frequently purchased music album in the sub-area,
a music album having a greatest increase in purchases in the sub-area over a defined period of time,
a music album having a greatest decrease in purchases in the sub-area over a defined period of time,
a most purchased media genre in the sub-area,
a most frequently purchased media genre in the sub-area,
a media genre having a greatest increase in purchases in the sub-area over a defined period of time, and
a media genre having a greatest decrease in purchases in the sub-area over a defined period of time.

20. The method of claim 3 wherein determining the representative information comprises, for each of a plurality of sub-areas within the geographic area of interest:
processing the media interaction histories of at least a subset of the plurality of users to identify media items that were played within the sub-area and satisfy one or more additional criteria; and
determining representative information for the sub-area based on the media items that were played within the sub-area and satisfy the one or more additional criteria.

21. The method of claim 20 wherein effecting display of the representative information comprises, for each sub-area of the plurality of sub-areas, effecting display of the representative information for the sub-area within an area on a map that corresponds to the sub-area of the geographic area of interest.

22. The method of claim 20 wherein the one or more additional criteria comprise one or more of a group consisting of: one or more user-based criteria, one or more content-based criteria, and one or more time-based criteria.

23. A central server comprising:
a communication interface communicatively coupling the central server to a plurality of devices of a plurality of users via a network; and
a control system associated with the communication interface and adapted to:
obtain media interaction histories of the plurality of users, each media interaction history identifying media items interacted with by a corresponding one of the plurality of users and locations at which at least a subset of the media items were interacted with by the corresponding one of the plurality of users;
obtain a geographic area of interest;
determine representative information for the geographic area of interest by processing the media interaction histories of at least a subset of the plurality of users; and
effect display of the representative information.

24. The central server of claim 23 wherein, in order to determine the representative information, the control system is further adapted to:
process the media interaction histories of at least a subset of the plurality of users to identify media items interacted with in the geographic area of interest; and
determine the representative information for the geographic area of interest based on the media items interacted with in the geographic area of interest.

25. The central server of claim 24 wherein, in order to effect display of the representative information, the control system is further adapted to effect display of the representative information within an area on a map that corresponds to the geographic area of interest.

26. The central server of claim 23 wherein, in order to determine the representative information, the control system is further adapted to, for each of a plurality of sub-areas within the geographic area of interest:
process the media interaction histories of at least a subset of the plurality of users to identify media items interacted with in the sub-area; and
determine representative information for the sub-area based on the media items played within the sub-area.

27. The central server of claim 26 wherein, in order to effect display of the representative information, the control system is further adapted to, for each sub-area of the plurality of sub-areas, effect display of the representative information for the sub-area within an area on a map that corresponds to the sub-area of the geographic area of interest.

28. A non-transitory computer readable medium storing software for instructing a controller of a computing device to:
- obtain play histories of a plurality of users, each play history identifying media items played by a corresponding one of the plurality of users and locations at which at least a subset of the media items were played by the corresponding one of the plurality of users;
- enable a user to select one or more geographic areas;
- process the play histories of at least a subset of the plurality of users to identify one or more media items played within the one or more geographic areas; and
- provide data that reflects the one or more media items played within the one or more geographic areas.

29. A non-transitory computer readable medium storing software for instructing a controller of a computing device to:
- obtain media interaction histories of a plurality of users, each media interaction history identifying media items interacted with by a corresponding one of the plurality of users and locations at which at least a subset of the media items were interacted with by the corresponding one of the plurality of users;
- enable a user to select one or more geographic areas;
- process the media interaction histories of at least a subset of the plurality of users to identify one or more media items interacted with in the one or more geographic areas; and
- provide data that reflects the one or more media items interacted with in the one or more geographic areas.

30. A non-transitory computer readable medium storing software for instructing a controller of a computing device to:
- obtain media interaction histories of a plurality of users, each media interaction history identifying media items interacted with by a corresponding one of the plurality of users and locations at which at least a subset of the media items were interacted with by the corresponding one of the plurality of users;
- obtain a geographic area of interest;
- determine representative information for the geographic area of interest by processing the media interaction histories of at least a subset of the plurality of users; and
- effect display of the representative information.

* * * * *